United States Patent
McKinney et al.

(10) Patent No.: US 12,384,093 B2
(45) Date of Patent: Aug. 12, 2025

(54) DOOR ASSEMBLY FOR USE ON UTILITY TRUCK

(71) Applicant: Altec Industries, Inc., Saint Joseph, MO (US)

(72) Inventors: Ryan J. McKinney, Parkville, MO (US); Brad Harju, St. Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 39 days.

(21) Appl. No.: 17/720,886

(22) Filed: Apr. 14, 2022

(65) Prior Publication Data

US 2022/0234275 A1    Jul. 28, 2022

Related U.S. Application Data

(63) Continuation of application No. 15/803,525, filed on Nov. 3, 2017, now Pat. No. 11,305,478.
(Continued)

(51) Int. Cl.
| | |
|---|---|
| *B32B 3/28* | (2006.01) |
| *B29C 51/10* | (2006.01) |
| *B29C 51/26* | (2006.01) |
| *B29C 64/00* | (2017.01) |
| *B32B 7/08* | (2019.01) |
| *B33Y 80/00* | (2015.01) |

(Continued)

(52) U.S. Cl.
CPC ............ *B29C 51/267* (2013.01); *B29C 51/10* (2013.01); *B29C 64/00* (2017.08); *B32B 3/28* (2013.01); *B32B 7/08* (2013.01); *B33Y 80/00* (2014.12); *B66F 11/044* (2013.01); *F25D 23/082* (2013.01); *B29L 2031/724* (2013.01)

(58) Field of Classification Search
CPC ....... B29C 51/267; B29C 64/00; B29C 51/10; B29C 2791/006; B29C 48/0022; B29C 48/0017; B29C 48/07; B66F 11/044; F25D 23/082; B29L 2031/724; B33Y 80/00; B32B 3/28; B32B 3/30
USPC .................................................. 428/184, 185
See application file for complete search history.

(56) References Cited

U.S. PATENT DOCUMENTS

| | | |
|---|---|---|
| 1,704,556 A | 3/1929 | Coleman |
| 3,089,191 A | 5/1963 | Bert |
(Continued)

FOREIGN PATENT DOCUMENTS

| | | |
|---|---|---|
| WO | 2007117389 A2 | 10/2007 |
| WO | 2011105872 A2 | 9/2011 |
| WO | 2015040318 A1 | 3/2015 |

OTHER PUBLICATIONS

Door NPL (https://web.archive.org/web/20161105233144/https://www.doornmore.com/help/what-is-the-standard-size-for-residential-homes.html) (Year: 2015).
(Continued)

*Primary Examiner* — Joanna Pleszczynska
(74) *Attorney, Agent, or Firm* — Erise IP, P.A.

(57) ABSTRACT

A multi-sheet component for a utility vehicle that includes at least one gap between at least two of the sheets, thereby providing a component that enhances worker safety by increasing component stiffness and reducing component thickness. The component is manufactured through multi-sheet thermoforming and uses a conical frustum corrugation to increase stiffness.

20 Claims, 16 Drawing Sheets

Related U.S. Application Data

(60) Provisional application No. 62/418,841, filed on Nov. 8, 2016.

(51) Int. Cl.
*B66F 11/04* (2006.01)
*F25D 23/08* (2006.01)
*B29L 31/00* (2006.01)

(56) References Cited

U.S. PATENT DOCUMENTS

| | | | |
|---|---|---|---|
| 3,527,664 A * | 9/1970 | Hale | E04C 2/34 |
| | | | 428/116 |
| 3,757,895 A | 9/1973 | Knutson | |
| 3,807,324 A | 4/1974 | Williamitis | |
| 4,334,594 A | 6/1982 | Jost | |
| 4,488,048 A | 12/1984 | Bienek et al. | |
| 4,763,758 A | 8/1988 | Moody | |
| 4,911,978 A | 3/1990 | Tsubone et al. | |
| 5,142,835 A | 9/1992 | Mrocca | |
| 5,215,202 A | 6/1993 | Fujimoto | |
| 5,482,343 A | 1/1996 | Bradac | |
| 5,533,311 A | 7/1996 | Tirrell et al. | |
| 5,538,679 A | 7/1996 | Wagner et al. | |
| 5,611,410 A | 3/1997 | Baillargeon | |
| 5,616,891 A | 4/1997 | Fumey | |
| 5,791,118 A * | 8/1998 | Jordan | B32B 3/28 |
| | | | 428/184 |
| 5,806,909 A * | 9/1998 | Wise | B60R 13/01 |
| | | | 296/97.23 |
| 6,225,556 B1 | 5/2001 | Saito | |
| 7,337,544 B2 | 3/2008 | Fagan et al. | |
| 7,866,730 B2 | 1/2011 | Lewis et al. | |
| 8,550,211 B2 | 10/2013 | Higgins et al. | |
| 9,249,003 B2 | 2/2016 | Reeves | |
| 9,460,557 B1 | 10/2016 | Tran et al. | |
| 2002/0018908 A1 | 2/2002 | Smith et al. | |
| 2003/0129379 A1 | 7/2003 | Yao et al. | |
| 2003/0189357 A1 | 10/2003 | Patberg et al. | |
| 2005/0031843 A1 | 2/2005 | Robinson et al. | |
| 2005/0142333 A1 * | 6/2005 | Montagna | B29C 66/21 |
| | | | 428/182 |
| 2007/0092712 A1 | 4/2007 | Hodson | |
| 2008/0063875 A1 | 3/2008 | Robinson et al. | |
| 2009/0039556 A1 | 2/2009 | Sawada et al. | |
| 2010/0123263 A1 | 5/2010 | Lewis et al. | |
| 2010/0215887 A1 | 8/2010 | Kawabe | |
| 2011/0240064 A1 | 10/2011 | Wales et al. | |
| 2012/0015176 A1 | 1/2012 | Riebel et al. | |
| 2012/0241250 A1 | 9/2012 | Eakin et al. | |
| 2013/0133261 A1 | 5/2013 | Choi | |
| 2013/0257100 A1 | 10/2013 | Marchesano et al. | |
| 2014/0151420 A1 | 6/2014 | Reeves | |
| 2015/0014198 A1 | 1/2015 | Blake | |
| 2015/0056131 A1 | 2/2015 | Bernasconi et al. | |
| 2015/0093177 A1 | 4/2015 | Morris | |
| 2015/0165724 A1 | 6/2015 | Cox et al. | |
| 2015/0268009 A1 | 9/2015 | Tunis, III et al. | |
| 2015/0378461 A1 | 12/2015 | Hashimoto et al. | |
| 2016/0008974 A1 | 1/2016 | Blake | |
| 2016/0032062 A1 | 2/2016 | Clauss et al. | |
| 2016/0049754 A1 | 2/2016 | Girard, Jr. et al. | |
| 2016/0208580 A1 | 7/2016 | Delzell et al. | |
| 2018/0126627 A1 | 5/2018 | McKinney et al. | |
| 2018/0216649 A1 * | 8/2018 | Avery | B32B 5/12 |

OTHER PUBLICATIONS

WIPO Patentscope Translation of disclosure of Kermorvant (WO 2015040318) (Year: 2015).
WIPO Patentscope Translation of disclosure of Im (WO 2011/105872) (Year: 2011).

* cited by examiner

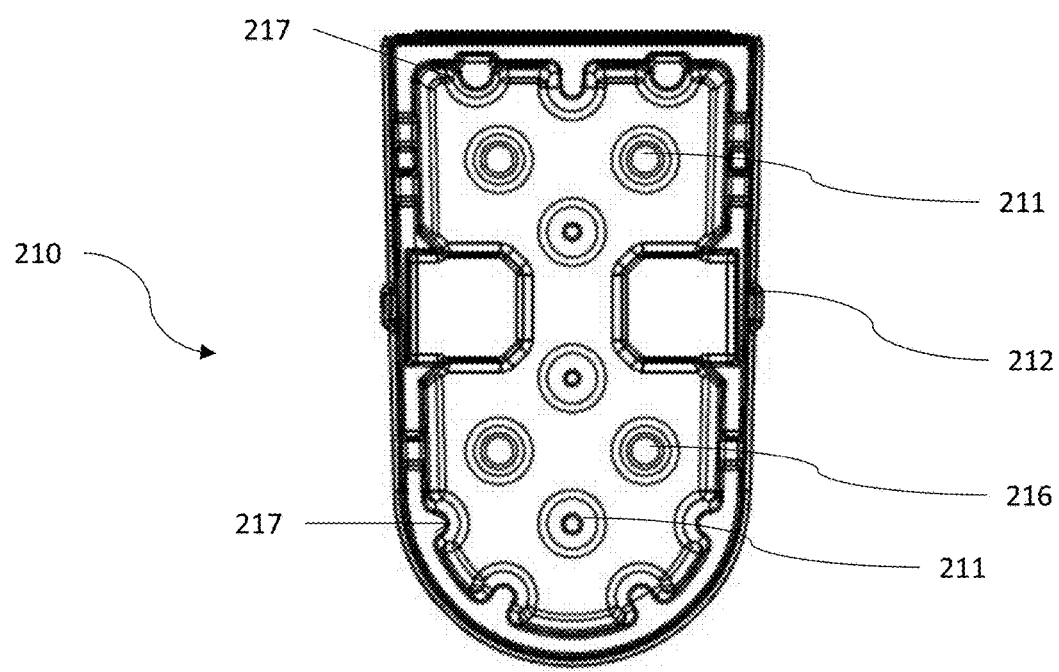
FIG. 7
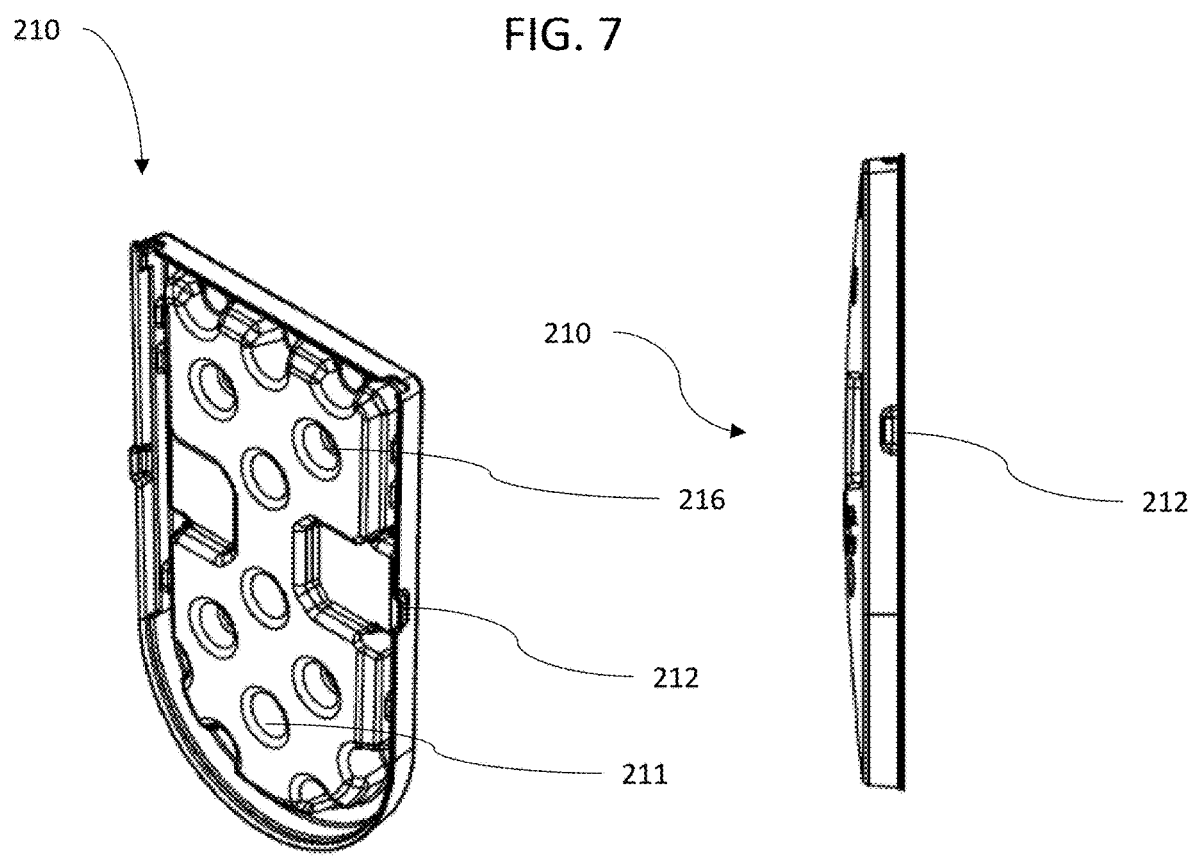
FIG. 8
FIG. 9

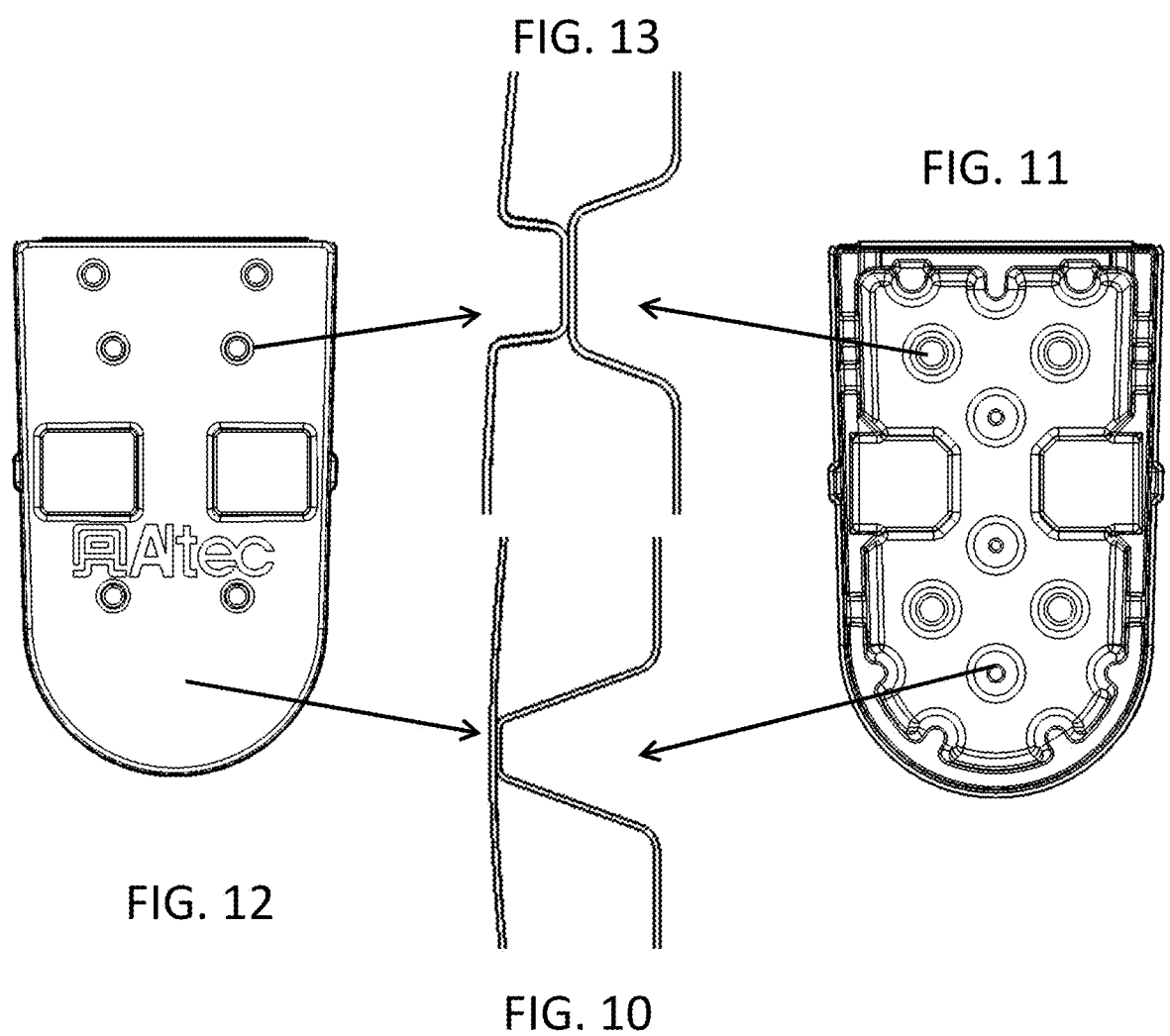

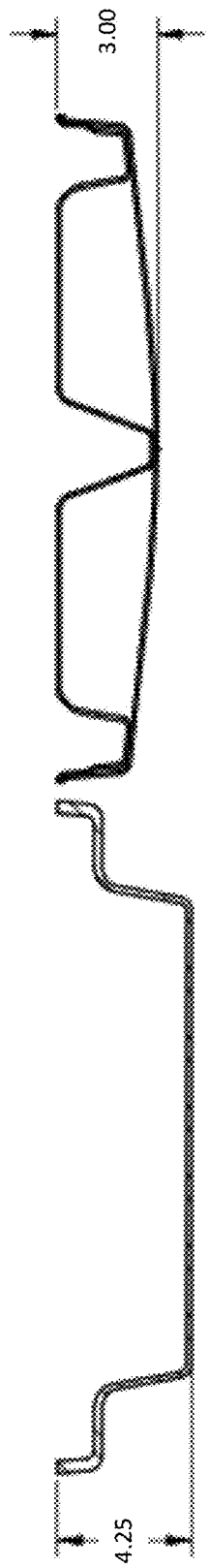

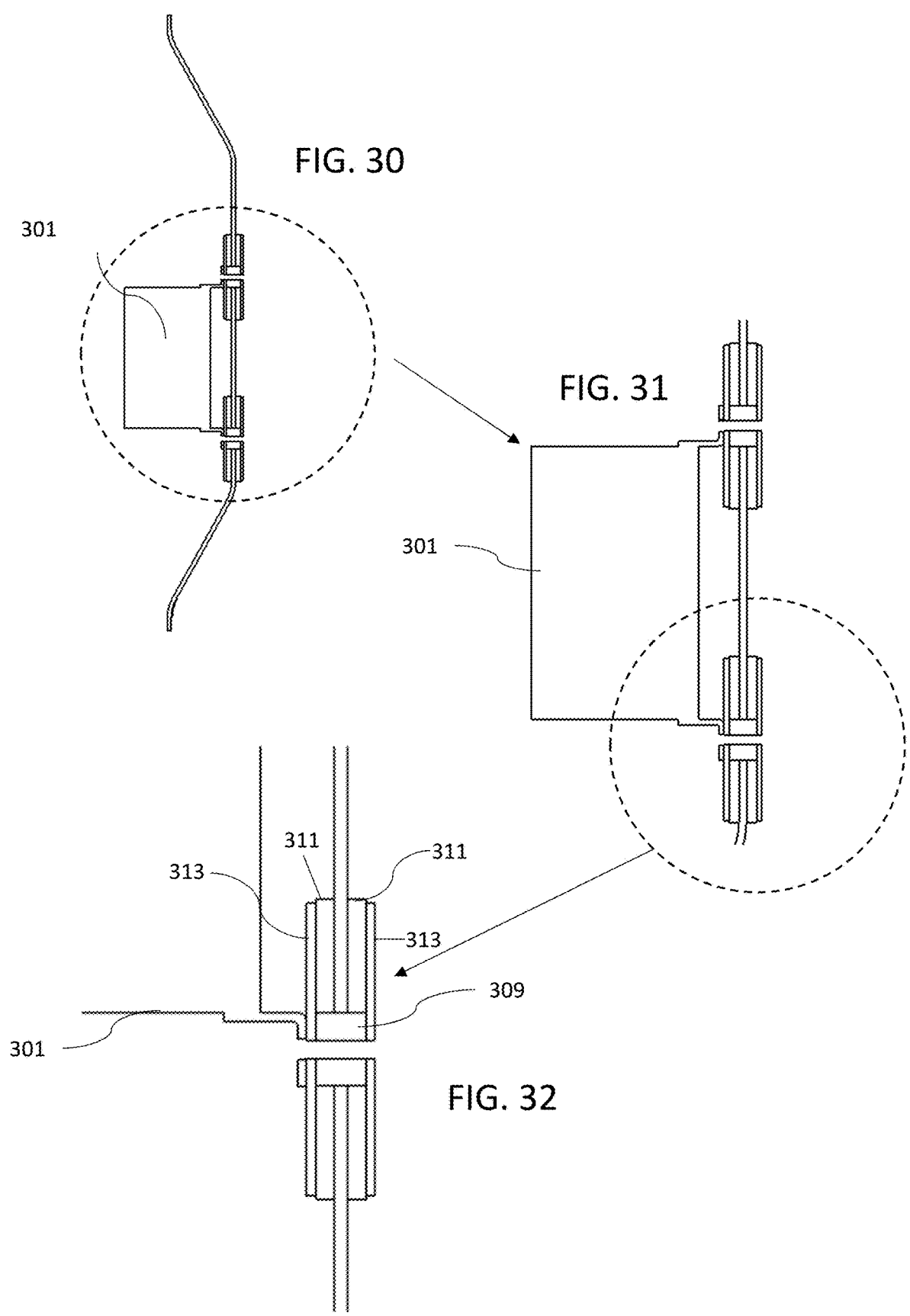

DOOR ASSEMBLY FOR USE ON UTILITY TRUCK

CROSS REFERENCES TO RELATED APPLICATIONS

This application is related to and claims priority from the following U.S. patent applications. This application is a continuation of U.S. application Ser. No. 15/803,525, filed Nov. 3, 2017, which claims the benefit of and priority to U.S. Provisional Patent Application No. 62/418,841, filed Nov. 8, 2016. Each of the above listed applications is incorporated herein by reference in its entirety.

BACKGROUND OF THE INVENTION

1. Field of the Invention

The present invention relates to aerial platforms for utility trucks, and more specifically to platforms with door openings, hereinafter referred to as "splicer platforms," and door assemblies for splicer platforms for utility trucks.

2. Description of the Prior Art

It is generally known in the prior art to provide a splicer bucket platform for application on utility truck booms.

Prior art patent documents include the following:

U.S. Pat. No. 7,337,544 for Method of forming a composite door structure by inventor Fagan et al., filed Jan. 16, 2007 and issued Mar. 4, 2008, discloses a method of forming a composite door is disclosed. The method comprises: mixing together a thermoplastic polymer with an organic fibrous material in a ratio such that the organic fibrous material constitutes 40 to 60 percent by weight of the mixture; extruding the mixture under heat and pressure to create a thin sheet form; cutting the sheet to a predetermined size; removing material from at least one surface of the sheet to create a homogeneous appearance devoid of obvious fibrous particles; thermoforming the sheet to impart to the at least one surface an exterior three dimensional door surface to create a thin door facing; and assembling two of the thermoformed thin door facings, a peripheral frame and a core material into a door.

U.S. Pat. No. 3,757,895 for an Aerial lift vehicle by inventor Knutson, filed Mar. 10, 1972 and issued Aug. 11, 1973, discloses an aerial lift vehicle having a carriage rotatably mounted on the vehicle, an electrically insulated boom support on said carriage and an aerial bucket pivotally carried at the upper end of said boom, a hydraulic system for moving the carriage and the boom, the hydraulic system including a number of electrohydraulic proportional remote control valves, a set of electric controllers mounted on said boom for operating the valves, manually actuated levers for each of said electric controllers mounted in a fixed position in said bucket, an electrically insulated push-pull assembly in said boom connecting each of said levers to a corresponding electric controller and a second set of electric controllers connected to said valves at a point remote from said valves, the electrically insulated push-pull assemblies being connected to the mechanical controllers through a set of coaxially arranged rotatable linear motion actuators positioned at the pivot point of the connection of the aerial bucket to the boom.

U.S. Pat. No. 5,533,311 for a Thermoformed plastic refrigerator door by inventor Tirrell et al., filed Aug. 30, 1994 and issued on Jul. 9, 1996, discloses a unitary plastic refrigerator door is produced by simultaneously thermoforming an outer refrigerator door panel with an inner refrigerator door liner. During production, an annular flange portion of the inner refrigerator door liner is joined with an annular sidewall portion of the outer refrigerator door panel at an attachment location positioned inwardly of the annular side wall portion. The inner refrigerator door liner is also formed with either an annular recess or a plurality of spaced recesses in its annular flange portion adjacent the attachment location of the inner refrigerator door liner and the outer refrigerator door panel that is adapted to press-fittingly receive a door gasket. Preferably, the outer refrigerator door panel includes a thickened portion that is formed with a handle defining recess. A method of thermoforming the refrigerator door is also provided and advantageously enables the inner refrigerator door liner to be produced on a male mold member.

U.S. Pat. No. 7,866,730 for Thermoformed twinsheet molded vehicle door system by inventor Lewis et al., granted on Jan. 1, 2011, discloses a twinsheet door which includes a first door portion and a second door portion connected to the first door portion. The twinsheet door of the present invention is manufactured using a thermoforming process, during which a vacuum shapes the first door portion and the second door portion such that one or more closed sections are created when the first door portion is thermally bonded to the second door portion and simultaneously a vacuum is applied to form the first door portion and said second door portion. The closed section formed between the first door portion and second door portion provides additional strength and rigidity to the twinsheet door. Additionally, the forming of the closed section between the first door portion and the second door portion and the bonding between the first door portion and second door portion is achieved during a single manufacturing process.

U.S. Pat. No. 4,334,594 for Aerial Device by inventor Jost, filed on Sep. 27, 1979 and granted on Jun. 15, 1982, discloses an articulated aerial device is provided which includes a workman's basket suspended from a movable beam. The basket is attached to the movable beam by an attaching means which selectively permits the basket to rotate for permitting easy access to an injured workman.

U.S. Pat. No. 5,611,410 for Aerial platform enclosure apparatus by Baillargeon, filed on Jul. 11, 1995, and granted on Mar. 18, 1997, discloses an aerial platform utility enclosure designed to be easily installed upon an unenclosed aerial platform bucket. The enclosure protects the worker from environmental elements without reducing visibility out of the bucket because a polycarbonate plastic such as LEXAN is used to cover the entire enclosure. Upper and lower structural components of the enclosure are constructed out of a non-conductive material. The lower structural component is firmly attached to the bucket while rotation of the upper structure and the protective cover in a full circle allows the worker to have greater access to his surroundings without having to reposition the bucket.

U.S. Pat. No. 4,763,758 for Scuff pad with step by inventor Moody, filed on Dec. 22, 1986 and granted on Aug. 16, 1988, discloses a scuff pad with step with which resides interiorly of an aerial lift bucket, or bucket liner if provided, at the bottom thereof and which includes a base portion and an upwardly extending portion extending upwardly of the base portion of a predetermined distance, the base portion has a top surface for being engaged by the shoes of said person upon standing in said bucket or liner to prevent scuffing, and the upwardly extending portion has a top surface providing a step which facilitates climbing out of said bucket or liner by the workman.

U.S. Pat. No. 9,249,003 for Tool holder for an aerial bucket lift by inventor Reeves, filed on Nov. 27, 2013 and granted on Feb. 2, 2016, discloses a tool holder for a bucket lift is disclosed. The tool holder includes a backboard having left, right, front and back sides. A left side member and a right side member are attached to the left side and right side, respectively, of the backboard. A scabbard portion is attached to the front side of the backboard; the scabbard portion forms a pocket between the scabbard portion and backboard. A left hook and a right hook extend from the left side member and right side member respectively, the left hook and right hook are configured and arranged to couple to a bucket of an aerial bucket lift.

US Patent Publication No. 20120241250 for Aerial Work Platforms and Aerial Work Platform Assemblies Comprised of Polymerized Cycloolefin Monomers by inventor Eakin et al., filed on Mar. 26, 2012 and published on Sep. 27, 2012, discloses an aerial work platform assembly includes: a) a platform shaft retaining assembly; b) a mounting bracket connected to the platform shaft retaining assembly; and c) a platform connected to the mounting bracket. The platform shaft retaining assembly includes two concentric apertures for installation of a pivot shaft therein; the mounting bracket having an upper gusset member and a center gusset member that are bonded together and that include horizontal portions to which the pivot shaft is bonded; upper and lower platform pins; a valve bracket; a platform bracket; and upper platform pins that provide for pivoting on a lower platform pin and tilting down of the platform thereby. At least one of the platform shaft retaining assembly, the mounting bracket, the platform, the upper and lower platform pins, and the valve bracket are molded from at least one monomer having at least one norbornene functionality, such as polydicyclopentadiene.

U.S. Pat. No. 5,215,202 for a Mobile vehicular apparatus with aerial cabin by inventor Fujimoto, filed Mar. 25, 1992 and granted Jun. 1, 1993, discloses a mobile vehicular apparatus for moving an operator around a three-dimensional aerial work location such as an electric cable or wire supported on posts includes a mobile vehicle having a vehicle body, a boom upwardly extensibly and downwardly collapsibly mounted on the vehicle body, an operator's cabin mounted on a distal end of the boom, cabin having a vertical recess defined in a rear side thereof, at least one manipulator operatively connected to a front side of the cabin, and a lifter operatively connected to the rear side of the cabin. The lifter is collapsibly storable in the recess and extensible from the recess with a distal end portion of the lifter being positioned in overhanging relation to the cabin, the lifter supporting a winding device on the distal end portion.

US Patent Publication No. 20020018908 for Structures having enhanced slip-resistant surfaces and associated methods by inventor Smith et al., filed Nov. 19, 1999 and published Feb. 14, 2002, discloses a structure and associated methods are provided having enhanced slip-resistant surfaces formed on the projections, recesses or other surfaces of the structure to promote safe and stable movement of people and/or objects on the structure. These structures can include, for example, those materials commonly installed on vehicles such as emergency vehicles. The methods associated with the structure include roughening at least one smooth surface of the structure to provide an enhanced slip-resistant surface. In separate aspects of the method, for example, mechanical roughening processes are disclosed which employ a set of two rollers, a single roller or a punch die arrangement to roughen a smooth surface of a structure. The enhanced slip-resistant structure can then be installed on a vehicle or employed in a variety of other applications where safe and stable movement of people and/or objects is desirable.

U.S. Pat. No. 8,550,211 for Aerial work assembly using composite materials by inventor Higgins et al., filed on Sep. 23, 2008 and granted on Oct. 8, 2013, discloses an aerial work assembly including components having composite materials including a fabric-reinforced resin for providing electrically non-conductive assembly, by insulating and/or isolating conductive components.

SUMMARY OF THE INVENTION

The present invention relates to a splicer platform and door assembly that incorporates a resin transfer molding (RTM) process as well as multi-sheet thermoforming process thereby enhancing worker safety by increasing platform strength and reducing dielectric hazards.

It is an object of this invention to provide a door for a utility vehicle. It is another object of the present invention to incorporate multi-sheet thermoforming in the design and manufacture of the splicer door. It is a further object of the present invention to provide a splicer door assembly that reduces the risk of dielectric hazards during operation. It is a further object of the present invention to reduce manufacturing costs while increasing manufacturing consistency of the splicer door assembly. It is a further object of the present invention to provide a splicer door design with increased strength and reduced weight. It is a further object of the present invention to provide a splicer door design that increases the operational range of a utility truck boom. It is a further object of the present invention to provide a splicer door design with tool storage capabilities.

One embodiment of the present invention provides a multi-sheet thermoformed component for use in a utility vehicle and a splicer platform.

Another embodiment of the present invention provides a door assembly that reduces the dielectric hazards to the operator while increasing the operational range of a utility truck boom.

Another embodiment of the present invention provides a method for manufacturing a multi-sheet component for a utility vehicle that reduces the dielectric hazards to the operator while increasing the operational range of a utility truck boom.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 7 illustrates a back view of a splicer door according to one embodiment of the present invention.

FIG. 8 illustrates a perspective view of the embodiment illustrated in FIG. 7.

FIG. 9 illustrates a side view of the embodiment illustrated in FIG. 7 and FIG. 8.

FIG. 10 illustrates a cross-section view of unilateral corrugation according to the present embodiment.

FIG. 11 illustrates a back sheet of a door with corrugations according to the present embodiment.

FIG. 12 illustrates a front sheet of a door with corrugations according to the present embodiment.

FIG. 13 illustrates a cross-section view of a bilateral corrugation according to the present embodiment.

FIG. 14C illustrates cross-section view of a prior art fiberglass door.

FIG. 14D illustrates a cross-section view of a door according to the present invention.

FIG. 30 illustrates a side cross-section view of the knee space incorporating a heater illustrated in FIG. 28 and FIG. 29.

FIG. 31 illustrates a closer side cross-section view of the heater and mounting bracket of the embodiment of FIG. 30.

FIG. 32 illustrates a close-up side cross-section view of the mounting bracket illustrated in FIGS. 30 and 31.

DETAILED DESCRIPTION

Figure 1:
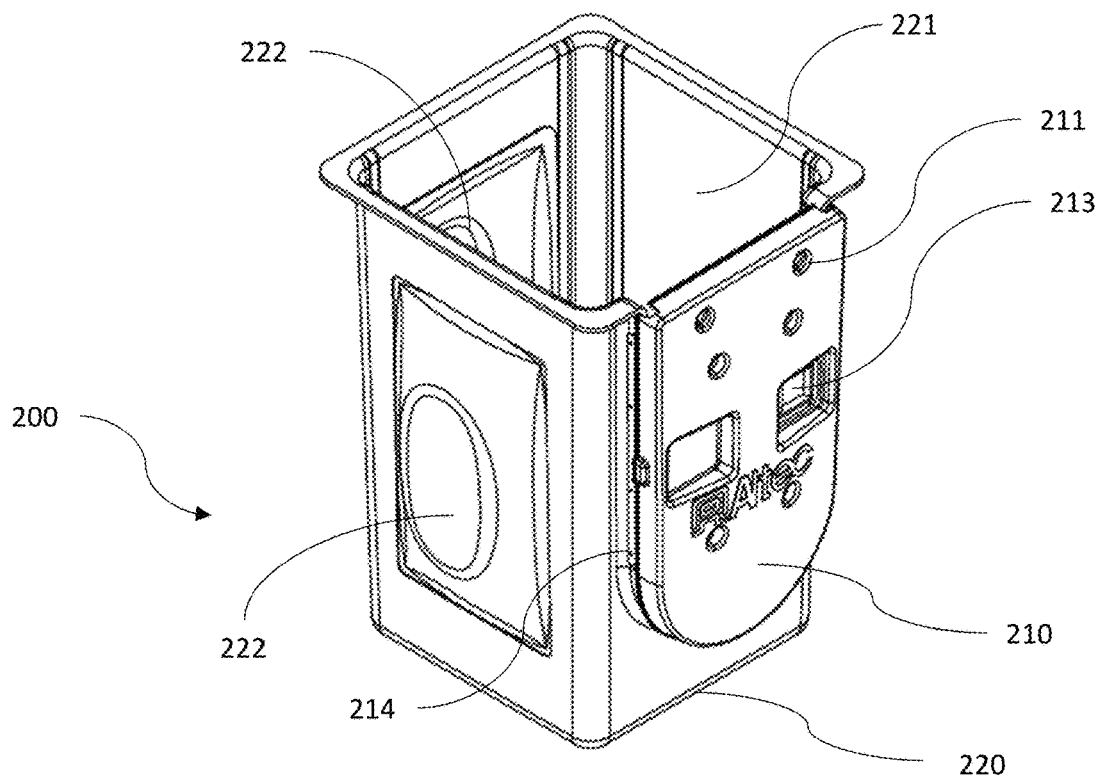
FIG. 1 illustrates a perspective view of a splicer door and splicer platform assembly according to one embodiment of the present invention.

The present invention is generally directed to a door for a utility vehicle.

The present invention is further directed to a splicer platform and splicer door assembly.

In one embodiment, the present invention includes a door for use in a utility vehicle, including the platform, that reduces dielectric hazards.

In another embodiment, the present invention includes a splicer platform with transparent panels and anti-slip protection.

In yet another embodiment, the present invention provides for a splicer platform and splicer door assembly that increases the operational range of a utility truck boom.

In the following description, the invention is referred to as a splicer door; however, the invention is intended for use in all areas of a utility vehicle. Typical prior art generally provides for use of thermoforming in door applications as well as composite materials in splicer platforms. The prior art does not disclose, teach, or suggest the use of multi-sheet thermoforming to reduce door profile, enhance boom reach, and reduce dielectric hazards in splicer doors or splicer platforms.

The present invention is directed to a method of incorporating multi-sheet thermoforming into the design and manufacture of a splicer door that is lighter and stronger than prior art doors, while also providing a reduction in dielectric hazards. The present invention is further directed to a method of incorporating Light Resin Transfer Molding (RTM) into the design and manufacture of a splicer platform that is lighter, stronger, and produces fewer volatile organic compounds (VOCs) during manufacture. The method of the present invention includes assembling the splicer door and splicer platform with use of a hinge. More preferably, the splicer door and splicer platform are assembled at the time of manufacture through use of a living hinge.

Referring now to the drawings in general, the illustrations are for the purpose of describing a preferred embodiment of the invention and are not intended to limit the invention thereto.

Door & Platform Assembly

FIG. 1 is a perspective view of a splicer door and platform assembly according to one embodiment of the present invention. The splicer door and platform assembly 200 includes a splicer door 210 and a splicer platform 220. The splicer door 210 and splicer platform 220 are assembled by a bolted or riveted hinge 214. The splicer door 210 incorporates a fully recessed handle 213 and recessed mounting locations 211, thereby reducing dielectric hazards associated with contact points. The splicer platform 220 includes panels 221 and knee spaces 222. Alternatively, the splicer platform 220 is manufactured without the knee spaces 222.

Figure 2:
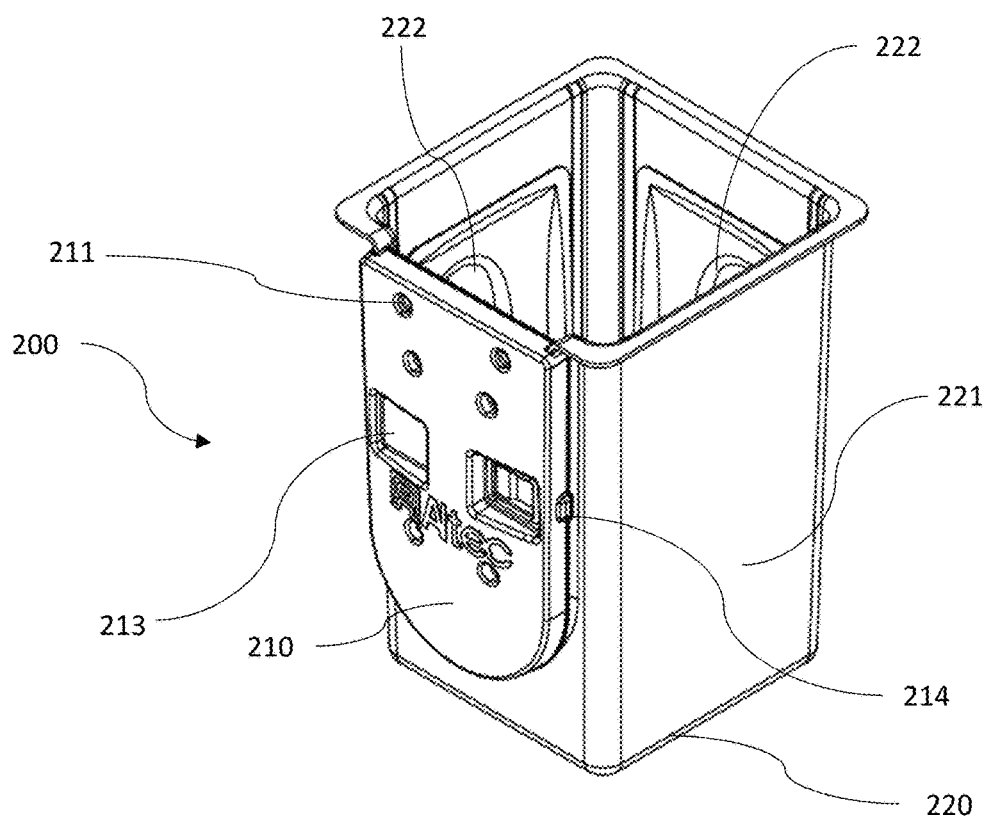
FIG. 2 illustrates an additional perspective view of the embodiment illustrated in FIG.

FIG. 2 is another perspective view of the embodiment illustrated in FIG. 1, showing the splicer door and platform assembly 200 with the splicer door 210 connected to the splicer platform 220 via the bolted hinge 214, wherein the splicer door 210 includes the recessed mounting locations 211 and the fully recessed handle 213 and the splicer platform 220 includes panels 221 and knee spaces 222.

Figure 3:
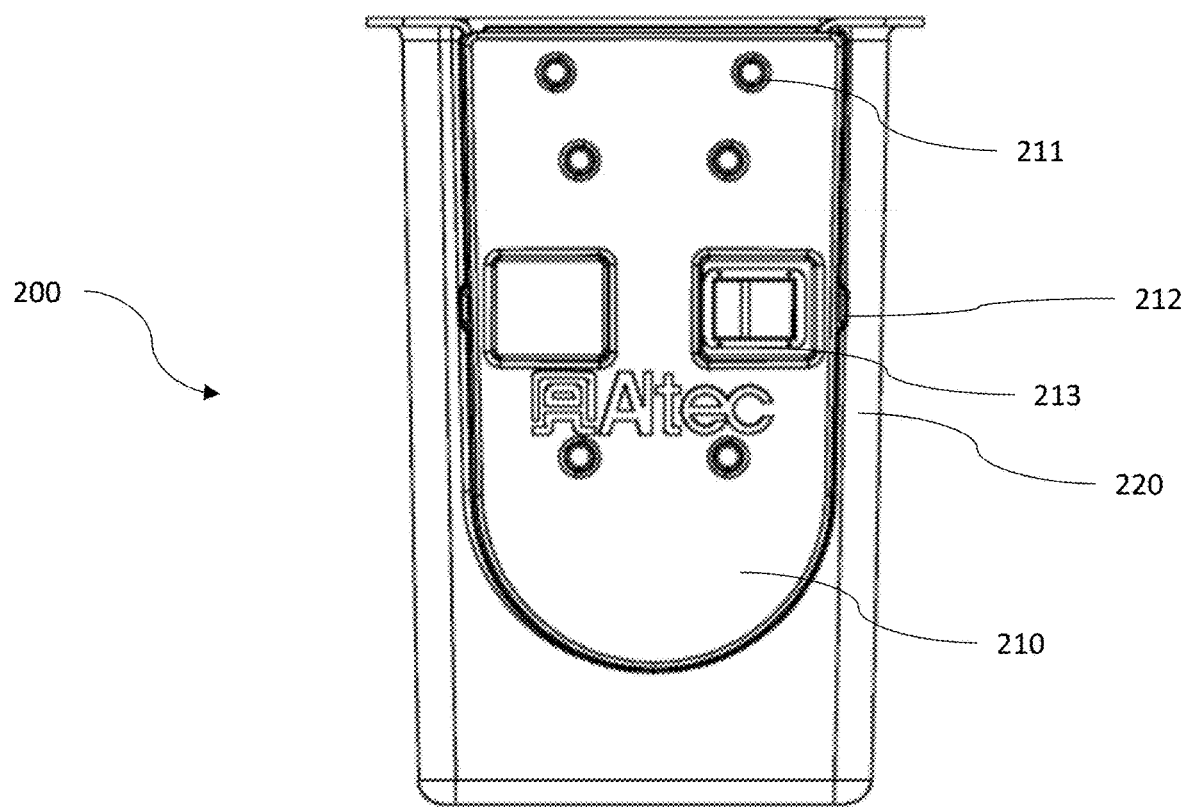
FIG. 3 illustrates a front view of the embodiment illustrated in FIG. 1 and FIG. 2.

FIG. 3 is a side view of the embodiment illustrated in FIG. 1 and FIG. 2, showing the splicer door and platform assembly 200 with the splicer door 210 connected to the splicer platform 220 via the bolted or riveted hinge 214, wherein the splicer door 210 includes the recessed mounting locations 211 and the fully recessed handle 213 as well as a covered striker pin 212 and the splicer platform 220 includes panels 221. The covered striker pin is advantageous over the prior art as it reduces the points of contact that are at risk for dielectric hazards while simultaneously reducing catch points, thereby providing increased worker safety.

Figure 4:
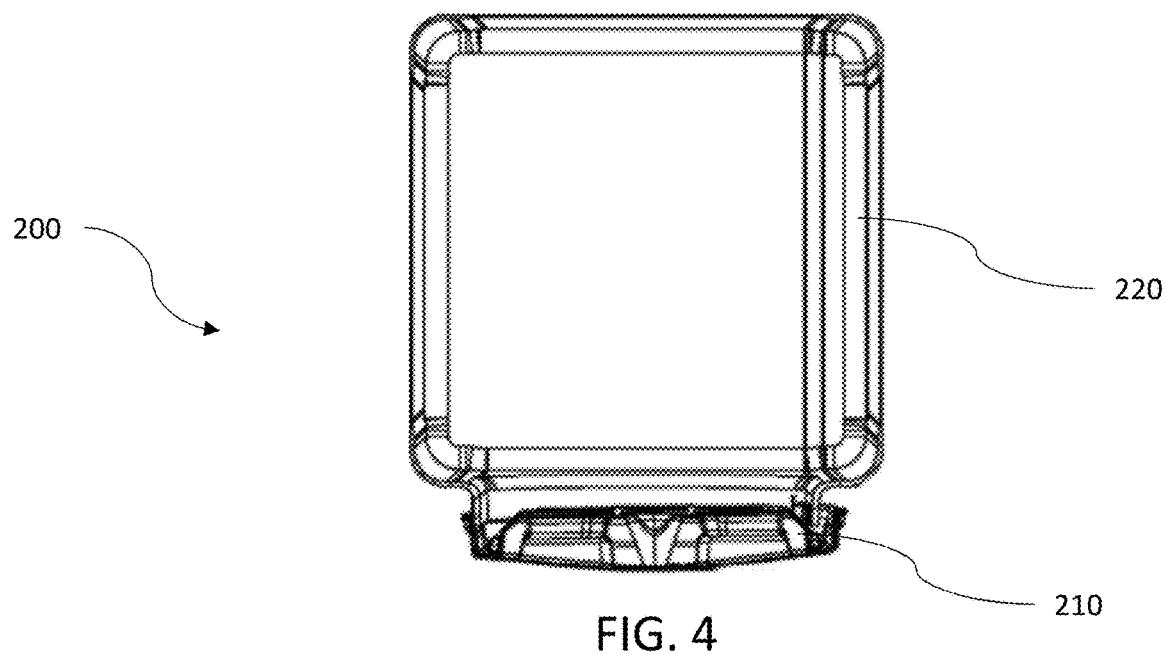
FIG. 4 illustrates a top-down view of the embodiment illustrated in FIG. 1, FIG. 2, and FIG. 3.

FIG. 4 is a top-down view of the embodiment illustrated in FIG. 1, FIG. 2, and FIG. 3, showing the splicer door and platform assembly 200 with the splicer door 210 connected to the splicer platform 220.

Figure 20:
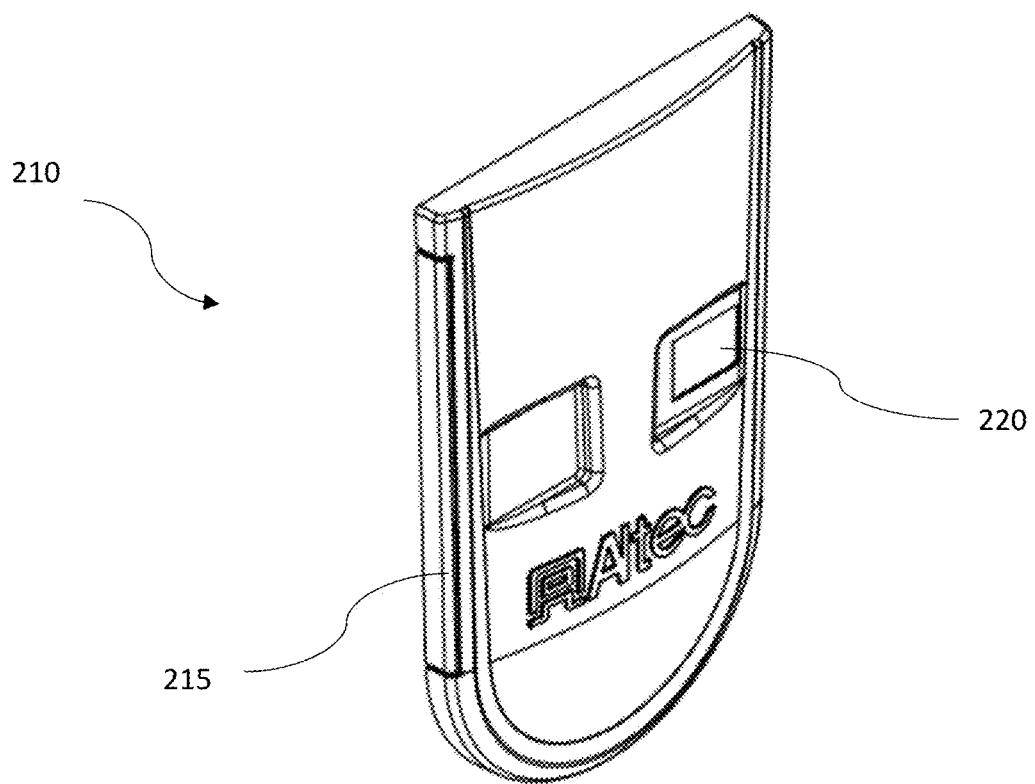
FIG. 20 illustrates a perspective view of a splicer door with a living hinge according to one embodiment of the present invention.

In one embodiment of the present invention, the splicer door is attached through a bolted or riveted hinge as illustrated in FIG. 1. In a preferred invention, the bolted hinge is recessed, thereby providing an advantage over the prior art designs as it reduces the catch risk of the user. Alternatively, the splicer door is attached to the platform assembly through the use of a living hinge 215, as illustrated in FIG. 20. The use of a living hinge further reduces metallic components utilized in the platform assembly, thereby reducing dielectric hazards during operation. Additionally, the use of a living hinge reduces the complexity of the final assembly by reducing the number of assembly pieces. In one embodiment of the present invention, the splicer door swings open to the right. Alternatively, the splicer door swings open to the left.

In a preferred embodiment of the present invention, the splicer door design includes a bumper strip that ensures the door is not opened past 90 degrees from the closed position against the platform. In one embodiment, the bumper strip is made from rubber. Alternatively, the bumper strip is made from plastic. In an alternative embodiment, the splicer door includes a strap that attaches to the splicer platform that prevents the splicer door from opening past 90 degrees from the closed position against the platform.

Door

Figure 5:
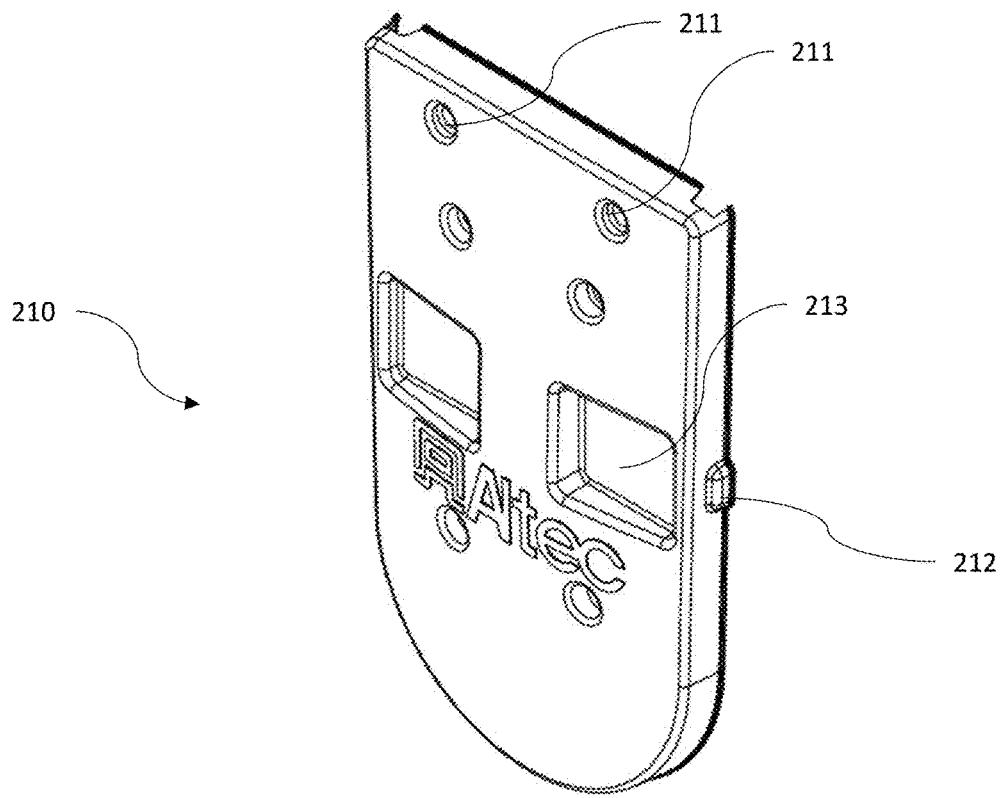
FIG. 5 illustrates a perspective view of a splicer door according to one embodiment of the present invention.

FIG. 5 is a perspective view of the splicer door 210 according to the embodiment in FIG. 1, showing the recessed mounting locations 211, the fully recessed handle 213, and the covered striker pin 212.

Figure 6:
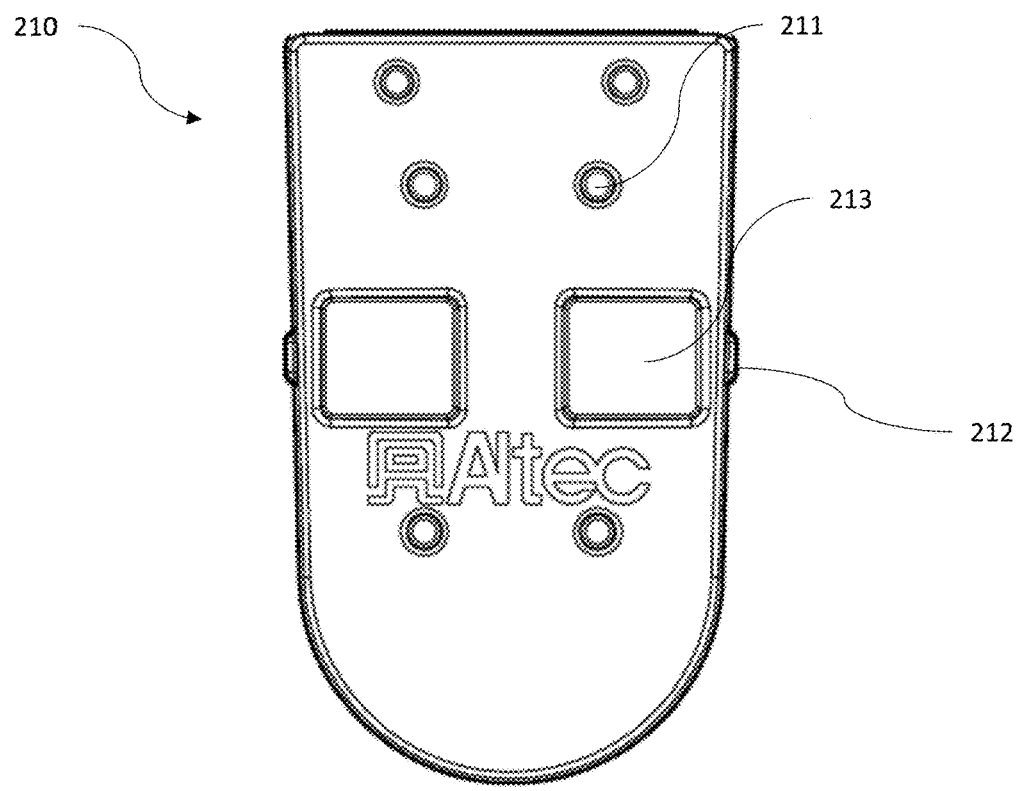
FIG. 6 illustrates a front view of the embodiment illustrated in FIG. 5.

FIG. 6 is a front view of the splicer door 210 illustrated in FIG. 5, showing the recessed mounting locations 211, the fully recessed handle 213, and the covered striker pin 212.

FIG. 7 is a back view of a preferred embodiment of the splicer door 210, showing the splicer door 210 with the recessed mounting locations 211 and the covered striker pin 212. FIG. 7 further illustrates the integration of the recessed mounting locations 211 into the internal design of the splicer door 210.

FIG. 8 is a perspective view of the preferred embodiment of the splicer door 210 illustrated in FIG. 7, showing the splicer door 210 with the recessed mounting locations 211 and the covered striker pin 212.

FIG. 9 is a side view of the preferred embodiment illustrated in FIG. 7 and FIG. 8, showing the covered striker pin 212.

Figure 15:
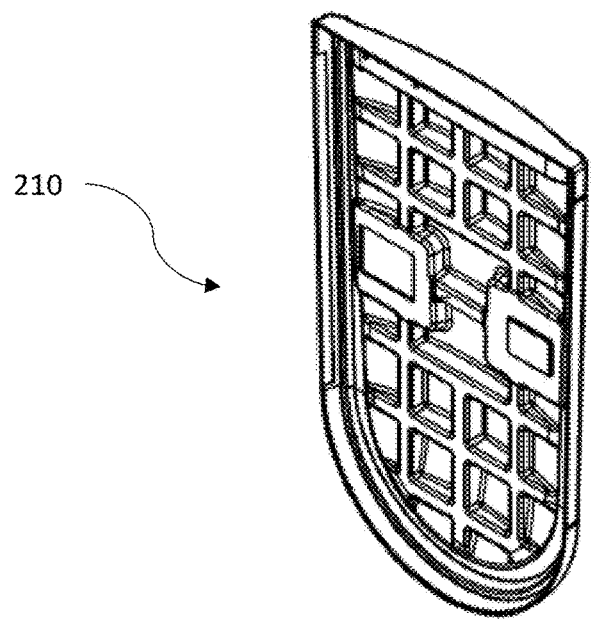
FIG. 15 illustrates a perspective view of a splicer door according to one embodiment of the present invention.
Figure 16:
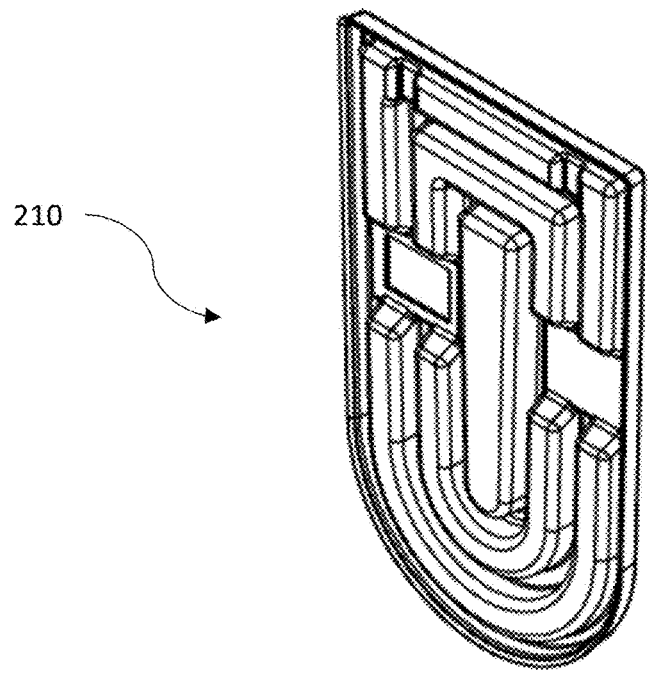
FIG. 16 illustrates a perspective view of a splicer door according to one embodiment of the present invention.

As shown in detail in FIGS. 10-13, the component includes a corrugation. A corrugation is any ridge(s) and groove(s) shaped into the component. The corrugation is in a repeating or alternating pattern in one embodiment. Alternatively, the corrugation is not in a repeating or alternating pattern. In some cases, the groove portion of the corrugation in one sheet contacts and/or joins another sheet. In a preferred embodiment shown in FIGS. 10-13, the corrugation is a conical frustum geometry. It is also a ribbed or grid pattern geometry in another embodiment, as shown in FIGS. 15-16. A domed shape or any other geometrical or amorphous shape also forms ridge(s) and groove(s). The corrugation is unilateral or bilateral. For unilateral corrugation (FIG. 10), one of the sheets is uncorrugated and the corrugation is made entirely from the other sheet. Preferably, the corrugation is made from the back sheet (FIG. 11) and is not visible on the front sheet (FIG. 12).

Figure 14A:
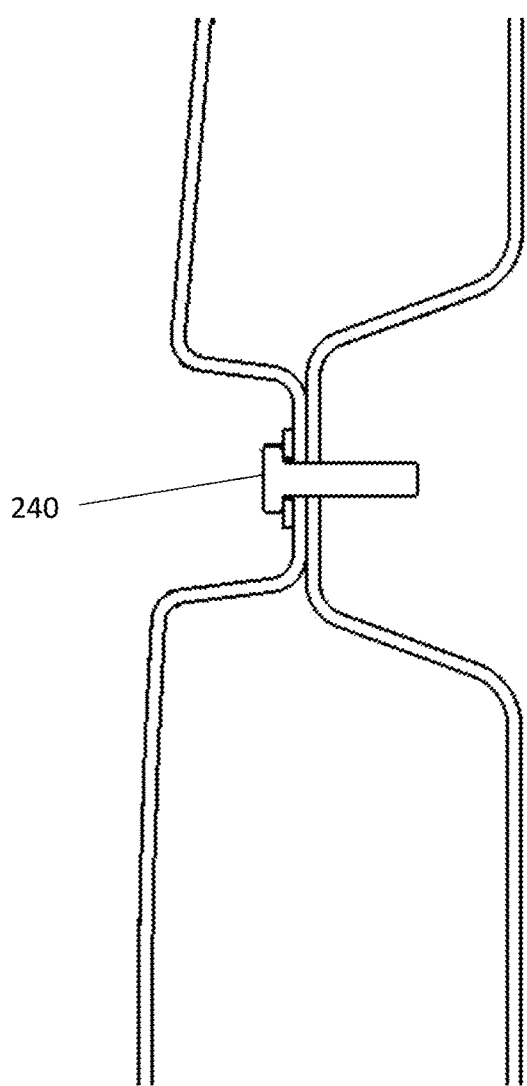
FIG. 14A illustrates a cross-section view of a bilateral corrugation with conductive hardware mounted.

In bilateral corrugation (FIG. 13), the height of the corrugation on the back sheet is reduced and a localized corrugation is created on the front sheet, extending into the part to meet the corrugation on the back sheet. In a preferred embodiment, the depths of the corrugations are approximately equal. The bilateral corrugation creates a mounting location on the front sheet through which conductive hardware 240 is mounted (FIG. 14A). The mounting location is fully recessed into the front sheet with raised surfaces surrounding it, thereby shielding it from contacting conductors such as power lines that have a greater length than the width of the corrugation. In one embodiment, the height of the corrugation on the back sheet is approximately half of the overall component cross-section. Thus, the mounting location is fully recessed into the front sheet with raised surfaces surrounding it, thereby shielding the conductive hardware from contacting a conductor greater than the width of the corrugation on the front sheet.

Figure 14B:
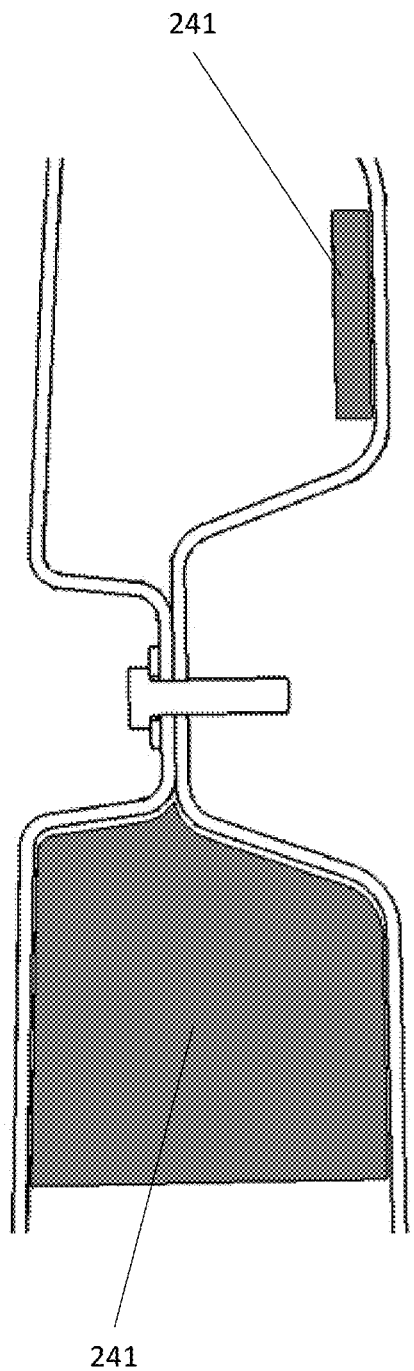
FIG. 14B illustrate a cross-section view of bilateral corrugation with core material inserted.

Shown in FIG. 14B is a core material 241, inserted during manufacturing. In one embodiment, core material is a lightweight material, for example foam, honeycomb or balsa wood, that serves to further strengthen and stiffen the part without drastically increasing the weight of the part. The core material completely fills the gap(s) between the sheets, or is placed in a selective manner and only partially fill the gap(s). In another embodiment, the core material is metallic or composite and serves alternative reinforcement purposes, for example screw retention for installing hardware. Preferably, this type of core material is selectively and locally placed to minimize weight. In yet another embodiment, the core material is a gas contained between the sheets. One example is helium that serves to lighten the component. In another example, the gas is pressurized and serves to stiffen the part. In yet another embodiment, the core material serves to create space between the sheets during the manufacturing process. After the process is complete, the core material is removed to leave an air gap between the sheets, or is left in the part. For example, one sheet is 3D printed, and then the core material is installed and serves as a support to 3D print the second sheet onto. After the 3D printing is complete, the core material is dissolved with a chemical to remove it.

The recessed mounting locations 211 of the splicer door design illustrated in FIG. 7 and FIG. 8 incorporate a corrugation that is a truncated conical or a conic frustum internal design structure 216 that provides enhanced rigidity over the prior art, according to a preferred embodiment of the present invention. Notably, the frustum internal design structure provides rigidity for plastic materials (by way of example thermoplastic polyolefin) which have superior impact resistance properties, but are usually less rigid than materials typically utilized in the prior art. The present invention incorporates plastic materials with an internal frustum design to reduce the cross-sectional depth of the splicer door while providing enhanced impact resistance and structural rigidity over the prior art. FIG. 14C is a cross-sectional view of a prior art fiberglass door, with a total weight of 15 lbs and a maximum depth of 4.25 inches. This door deflects 0.931 inches in a 200 lb. top corner test. The test is based on OSHA Standard 1910.23 Subpart D (April 1971), incorporated by reference herein in its entirety, which requires the top of the door to withstand a 200 lb. load in any direction. FIG. 14D is a cross-sectional view of a door designed and configured according to the present invention, with a total weight of 9 lb. and a maximum depth of 3.00 inches. This door deflects 0.901 inches in a 200 lb. top corner test.

Additionally, the preferred embodiment achieves superior rigidity than even the alternate structural designs illustrated in FIG. 15 and FIG. 16. FIGS. 15 and 16 show ribbed corrugation designs.

Preferably, the frustum internal design structure utilizes frusta about 3 inches in base diameter. However, in another embodiment, the frusta are between about 2 inches in base diameter and about 4 inches in base diameter. Each square foot of the door utilizing the frustum internal design structure preferably includes about three to four frusta. Alternatively, each square foot of the door utilizing the frustum internal design structure includes about two to six frusta. The height of a frustum is between about 1.5 and about 4 inches. Preferably the height of a frustum is about 1.5-3 inches.

A preferred conic frustum internal design structure utilizes partial frusta along at least one edge of the internal design structure. FIG. 7 shows the partial frusta 217. These partial frusta are preferably located between about 5 to 7 inches apart on-center on the edge of the internal design structure. In another embodiment, these partial frusta are located between about 4 to 8 inches apart on-center on the edge of the internal design structure. The frusta reduce stress concentrations around the edges of the splicer door and make the splicer door stronger and stiffer.

The door utilizing the conic frustum internal design structure only deflected 0.901 inches total upon being subjected to a 200-lb. load test. Looking at the door from the outside, it is hinged along the left edge, and latched along the right edge at approximately the midpoint of the door height. The load is applied to the top, right, unsupported corner of the door above the hinge and the deflection measurement is taken where the load is applied. The door utilizing the conic frustum internal design structure is slightly stiffer than the heavier, thicker, fiberglass prior art door tested in the same configuration. The test is based on OSHA Standard 1910.23 Subpart D (April 1971), incorporated by reference herein in its entirety, which requires the top to withstand a 200 lb load in any direction.

FIG. 15 is an interior view of an alternative embodiment of the door of the present invention, showing an internal design structure utilizing a ribbed structure.

FIG. 16 is an interior view of an alternative embodiment of the door of the present invention, showing an internal design structure utilizing an alternative ribbed design.

Methods of Manufacturing

In a preferred embodiment of the present invention, the splicer door is multi-sheet thermoformed. In another embodiment, the door sheets are formed and then joined in a subsequent process, such as chemical bonding, physical bonding, welding, magnetism, vacuum or mechanical fastening. In yet another embodiment, one sheet is thermoformed and then the second sheet is laminated onto the first sheet. In another process, the door is formed by infusion, injection molding, compression molding, 3D printing, Digital Light Synthesis (DLS) including Continuous Liquid Infusion Production, and the like, as described in U.S. patent application Ser. No. 15/587,865, filed 2017 May 5; U.S. patent application Ser. No. 15/395,381, filed 2016 Dec. 30; U.S. patent application Ser. No. 15/361,644, filed 2016 Nov. 28; U.S. patent application Ser. No. 15/127,697, filed 2015 Mar. 6; U.S. patent application Ser. No. 15/356,911, filed 2016 Nov. 21; U.S. patent application Ser. No. 15/361,719, filed 2016 Nov. 28; U.S. patent application Ser. No. 15/428,708, filed 2017 Feb. 9; U.S. patent application Ser. No. 15/337,299, filed 2016 Oct. 28; U.S. patent application Ser. No. 15/315,298, filed 2015 Jul. 7; U.S. patent application Ser. No. 15/297,511, filed 2016 Oct. 19; U.S. patent application Ser. No. 15/302,843, filed 2015 Apr. 20; U.S. patent application Ser. No. 15/285,169, filed 2016 Oct. 4; U.S. patent application Ser. No. 15/201,958, filed 2016 Jul. 5; U.S. patent application Ser. No. 15/240,157, filed 2016 Aug. 18; U.S. patent application Ser. No. 15/143,986, filed 2016 May 2; U.S. patent application Ser. No. 15/196,951, filed 2016 Jun. 29; U.S. patent application Ser. No. 14/977,938, filed 2015 Dec. 22; U.S. patent application Ser. No. 14/937,304, filed 2015 Nov. 10; U.S. patent application Ser. No. 14/937,237, filed 2015 Nov. 10; U.S. patent application Ser. No. 14/937,151, filed 2015 Nov. 10; U.S. patent application Ser. No. 14/823,565, filed 2015 Aug. 11; U.S. patent application Ser. No. 14/756,942, filed 2015 Oct. 30; U.S. patent application Ser. No. 14/977,822, filed 2015 Dec. 22; U.S. patent application Ser. No. 14/977,876, filed 2015 Dec. 22; U.S. patent application Ser. No. 14/154,700, filed 2014 Jan. 14; U.S. patent application Ser. No. 14/977,974, filed 2015 Dec. 22; U.S. patent application Ser. No. 14/456,270, filed 2014 Aug. 11; U.S. patent application Ser. No. 14/570,591, filed 2014 Dec. 15; U.S. patent application Ser. No. 14/572,128, filed 2014 Dec. 16; U.S. patent application Ser. No. 14/569,202, filed 2014 Dec. 12; each of which is incorporated herein by reference in its entirety.

The multi-sheet embodiment is formed from two or more sheets. In one embodiment, a first sheet is a thermoformed plastic and a second sheet is a fiberglass. In this embodiment, the first sheet is a thermoplastic that serves to replace the gel coat that is used on the prior art fiberglass components. The fiberglass sheet provides the backing and structure in this embodiment, and in a preferred embodiment also contains the corrugation described herein. A thermoplastic sheet exterior provides superior weatherability relative to prior art gel coat. The elongation of the thermoplastic is significantly higher than the elongation of the gel coat, serving to eliminate the cracking that is sometimes found in gel coat when the part has been stressed or impacted. In the manufacturing process, the thermoplastic sheet is operable to be rapidly manufactured, compared to the prior art gel coat which must undergo a long cure time after it is applied. Also, the thermoplastic sheet eliminates VOC's that are associated with the prior art gel coat.

In another embodiment, additional sheets are used for various purposes. The preferred embodiment described herein contains 2 sheets, but in some cases additional sheets are needed. In one example, additional sheet(s) above the standard two sheets are joined to the part to provide additional strength and increased stiffness. In another example, additional dielectric protection above and beyond the recessed mounting locations is required, so additional sheet(s) are joined to the part to cover any conductive components and prevent an operator from being able to contact them. In yet another example, some ballistic protection is required for operator safety and additional sheet(s) that provide such protection are joined to the part.

In one embodiment of the present invention, the splicer door is manufactured from thermoplastic polyolefin (TPO). TPO provides the present invention with superior impact resistance over the fiberglass doors of the prior art. Alternatively, the splicer door is manufactured from clear polycarbonate, thereby enhancing operator safety by providing enhanced visibility of potential hazards. In yet another alternative embodiment, the splicer door is manufactured from polypropylene, polyethylene, and/or any other plastic, preferably any other plastic operable to undergo multi-sheet thermoforming.

In a preferred embodiment of the present invention, the splicer door is lighter than comparable splicer doors of the prior art. By way of example and not limitation, for similar sized doors, one embodiment of the splicer door of the present invention weighs 9 pounds, as opposed to the current market fiberglass doors that weigh approximately 15 pounds. This additional weight savings is advantageous over the prior art as it reduces the moment of the utility truck boom during operation, thereby allowing an operator to extend the utility truck boom further and/or increase the load in the platform without increasing the tipping risk. The lighter splicer door of the present invention also advantageously provides for equivalent or increased strength compared to heavier prior art doors of the same size or bigger sizes.

In another embodiment of the present invention, the splicer door is designed to reduce the number of tools required for manufacturing. Historically, prior art fiberglass doors are created at a rate of one door per tool per eight-hour shift. The splicer door design of the present invention is manufactured at a rate of one hundred seventy-five doors per tool per eight-hour shift. This provides for lower manufacturing costs and subsequently higher profits.

In another embodiment of the present invention, the splicer door profile is reduced to 4.5 inches while maintaining equivalent or improved structural rigidity. The reduction in profile thickness is advantageous over the previously required 6.5 inches with prior manufacturing techniques as it affords the user the ability to move the splicer door closer to the work location, thereby reducing the need to reach and apply undue stress on the lower back and upper extremities of the user. In the structural test OSHA Standard 1910.23 Subpart D (April 1971), the new door with the 4.5 inch profile showed equivalent or improved performance compared to the prior art 6.5 inch profile door. Stiffness and strength are maintained or improved despite the decrease in profile.

In a preferred embodiment of the present invention, the splicer door handle and mounting pins are fully recessed. Additionally, the present invention further provides the advantage of having the striker pin covered. This is advantageous over the prior art as it reduces the points of contact that are at risk for dielectric hazards while simultaneously reducing catch points, thereby providing increased worker safety.

Figure 17:
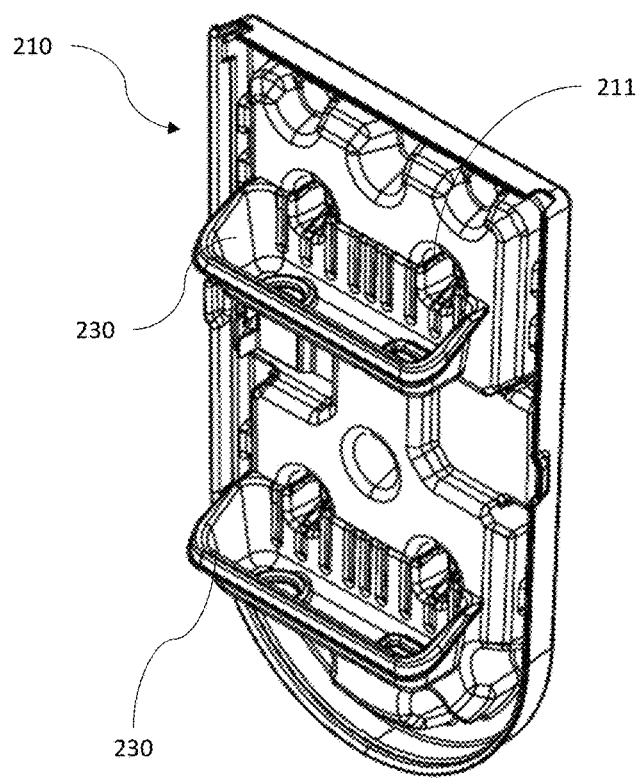
FIG. 17 illustrates a perspective view of a splicer door with tool storage according to one embodiment of the present invention.

FIG. 17 is a perspective view of the embodiment illustrated in FIG. 8, further showing the mounting of tool trays. The tool trays 230 mount to the back of the recessed mounting locations 211. The tool trays 230 are preferably modular and can be removed when not in use.

Figure 18:
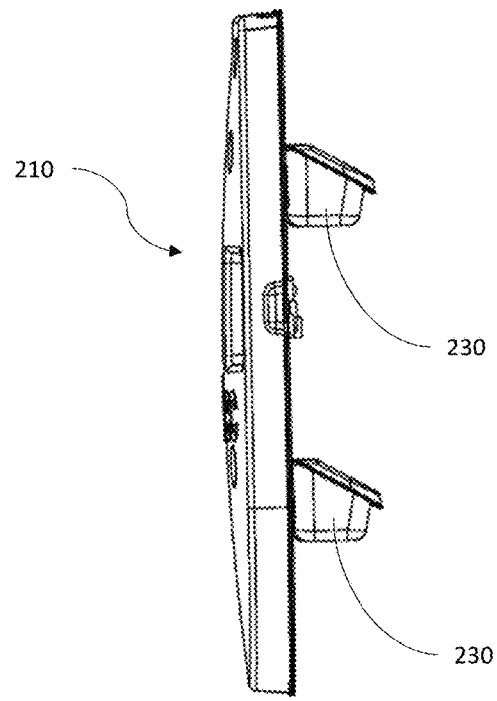
FIG. 18 illustrates a side view of the embodiment illustrated in FIG. 16.

FIG. 18 is a side view of the embodiment illustrated in FIG. 17.

Figure 19:
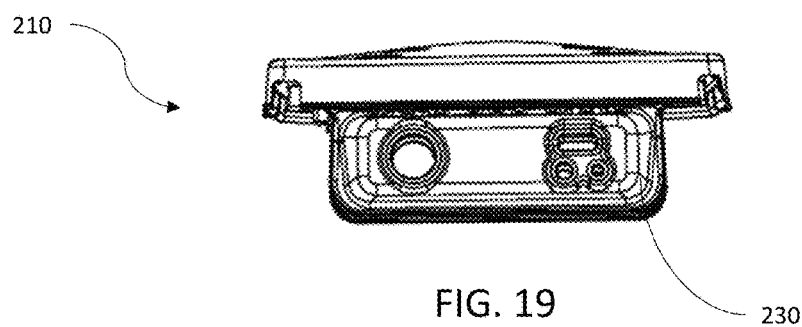
FIG. 19 illustrates a top-down view of the embodiment illustrated in FIG. 17 and FIG. 18.

FIG. 19 is a top-down view of the embodiment illustrated in FIG. 17 and FIG. 18.

In another embodiment of the present invention, the splicer door incorporates mounting points for tool storage, as illustrated in FIG. 17. Additionally, the mounting points are located such as to minimize bending and reaching for the tools while not impacting structural rigidity.

The sheets are preferably made from dielectric, impact-resistant and/or corrosion-resistant materials, including reinforced thermosets, unreinforced thermosets, reinforced thermoplastics, and/or unreinforced thermoplastics.

Thus, the manufacturing methods of the present invention allow for a less rigid material to be used in the component and the thickness of the part to be decreased, while maintaining or improving the component's structural rigidity vs. the prior art, all combined into a design that can be rapidly manufactured, has superior impact resistance, has reduced weight, and reduces dielectric hazards.

Platform

Figure 21:
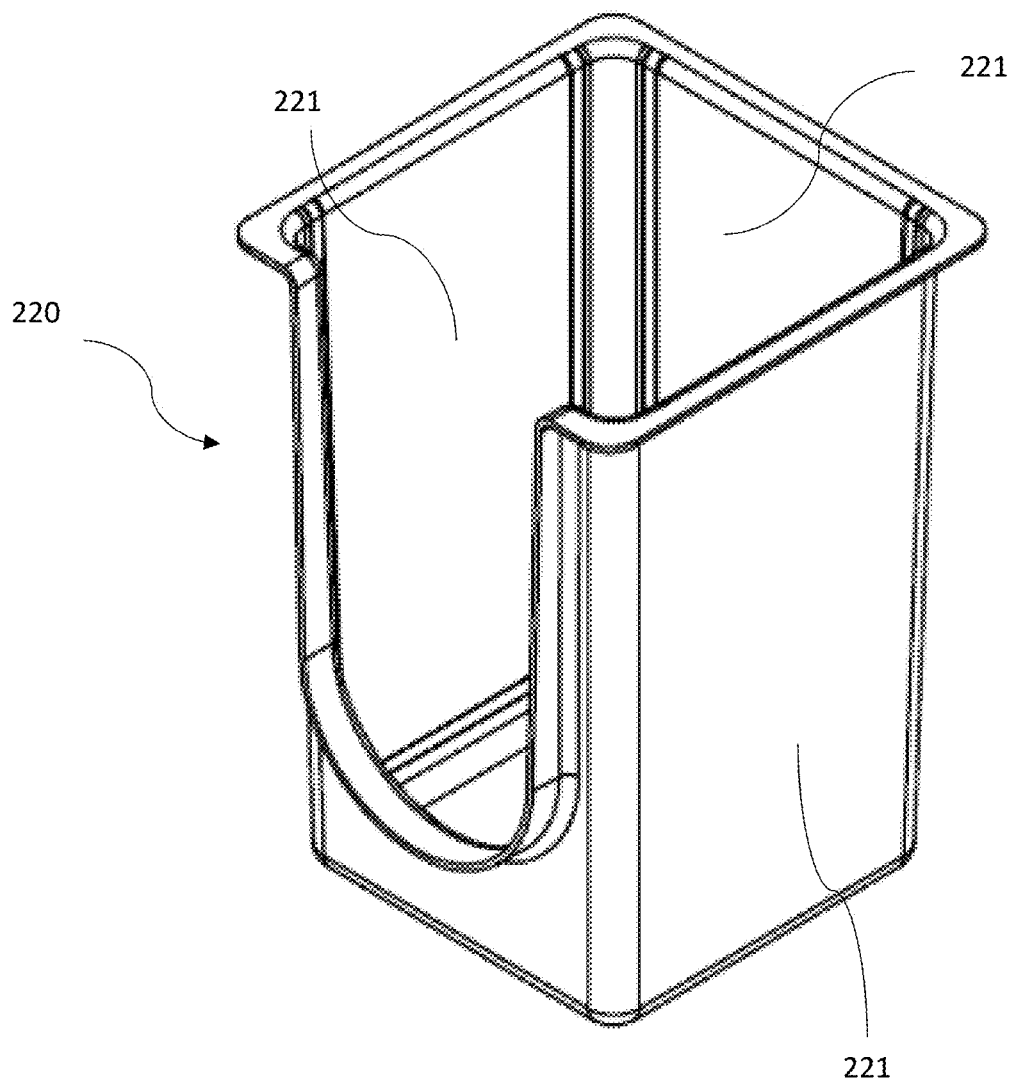
FIG. 21 illustrates a perspective view of a splicer platform according to one embodiment of the present invention.

FIG. 21 is a perspective view of the splicer platform 220 according to one embodiment of the present invention with panels 221.

Figure 22:
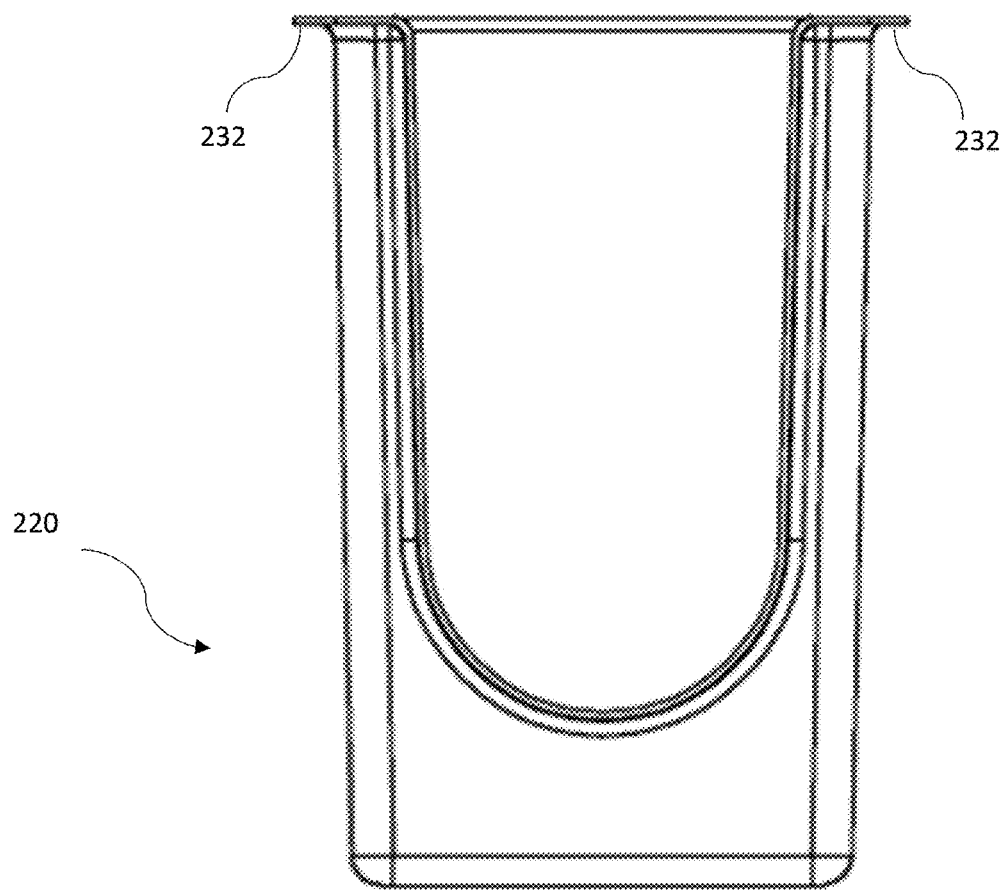
FIG. 22 illustrates a front view of the embodiment illustrated in FIG. 21.

FIG. 22 is a front view of the embodiment illustrated in FIG. 20 showing flanges 232.

Figure 23:
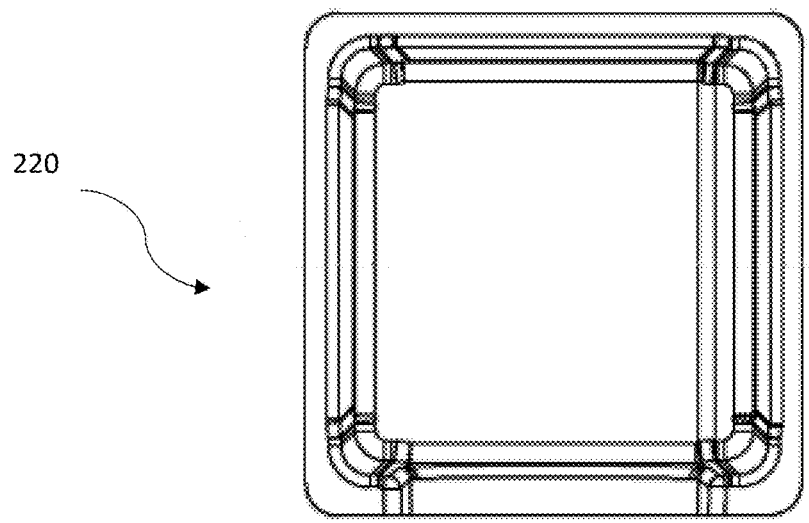
FIG. 23 illustrates a top-down view of the embodiment illustrated in FIG. 21 and FIG. 22.

FIG. 23 is a top-down view of the embodiment illustrated in FIG. 21 and FIG. 22.

In one embodiment of the present invention, the splicer platform weighs approximately 45 lbs. This is advantageous over the splicer platforms of similar size of the prior art which weigh approximately 75 lbs., as it reduces the moment of the splicer platform assembly during operation on a utility truck boom. As a result, the operator is capable of extending the utility truck boom beyond the range of prior art splicer platforms without increasing the tipping risk.

Preferably, the outside of the splicer platform is constructed with a rigid fiberglass tool and the inside is constructed with a thinner, semi-rigid fiberglass tool. The inside of the platform is preferably formed using light Resin Transfer Molding (RTM), which advantageously prevents glass wrinkling of the inside of the platform and creates a smooth inner surface. Light RTM simplifies manufacturing of the platform by making the inside of the platform easier to install. The glass wrinkling of the flanges is also eliminated with light RTM and provides sufficient strength for the flanges.

In another embodiment of the present invention, the splicer platform incorporates transparent panels for enhanced visibility by the user. This is advantageous over the prior art as it enhances safety for the user by allowing the user to more easily avoid contact with surrounding structures during operation of the truck boom.

In another embodiment of the present invention, the splicer platform is structurally stronger than prior art designs. The prior art method of utilizing "chop spray" is inconsistent and provides no ability to orient the short fibers that provide the strength of the structure. The present invention is advantageous over "chop spray," in part, because the incorporation of Light RTM allows for engineered fabrics incorporating specifically-oriented continuous fibers. Unlike prior art splicer platforms that rely on thicker sections containing randomly oriented fibers to provide the platform's strength, the present invention ensures the fibers are oriented in the direction of the greatest structural load, thereby maximizing the strength to weight ratio. In the prior art splicer platforms, excess resin beyond what is needed for strength is inherent within the chop spray process. In contrast, the present invention minimizes the amount of excess resin, thereby further maximizing the strength to weight ratio and providing an increased strength to weight ratio compared to the prior art. At standard sizes, the improved splicer platform is able to be rated to hold more weight than those of the prior art. By way of example and not limitation, the design of the present invention increases the rated capacity of the splicer platform to 500 lbs in a 26 inch by 26 inch platform. This is an increase in rated capacity of approximately 150 lbs. over the prior art. Additionally, unlike prior art designs where structural thickness is determined by how much material is sprayed, the present invention's material thickness is controlled by tooling. As such, the structural characteristics are highly predictable and afford the present invention a reduction in the structural factor of safety without compromising its overall structural rating.

In another embodiment of the present invention, the splicer platform assembly incorporates hinge hardware, handle hardware, and mounting hardware that are made from non-conductive materials. By way of example and not limitation, the hardware is manufactured from plastic. This is advantageous over the prior art as it further reduces the risk of dielectric hazards to the operator.

Additionally, the splicer platform of the present invention is more aesthetically pleasing than prior art designs. Prior art "chop spray" leads to a rough finish on the exterior of the splicer platform. The present invention allows for a smooth finish on both the interior and exterior of the splicer platform.

In another embodiment of the present invention, the splicer platform incorporates a non-skid floor feature for enhanced operator safety. The prior art splicer platforms require the secondary application of a non-skid material. In the present invention, the non-skid feature is included in the original mold design of the splicer platform, thereby reducing labor and material costs.

In an alternative embodiment of the present invention, the splicer platform incorporates modular ribs, thereby facilitating the use of rib-style mounting to the utility truck boom, as described in U.S. patent application Ser. No. 15/686,503 filed Aug. 25, 2017 and U.S. patent application Ser. No. 15/619,193 filed Jun. 9, 2017, both inventors McKinney et al. for Modular Rib for Elevating Platform, and both incorporated herein by reference in their entirety. Advantageously, utilizing the modular ribs allow the platform to be used in an insulating application.

Knee Space and Heater

In another embodiment of the present invention, the splicer platform incorporates side panels with knee spaces that facilitate an operator kneeling. Alternatively, the knee space is a mounting surface for a heater attachment.

Figure 24:
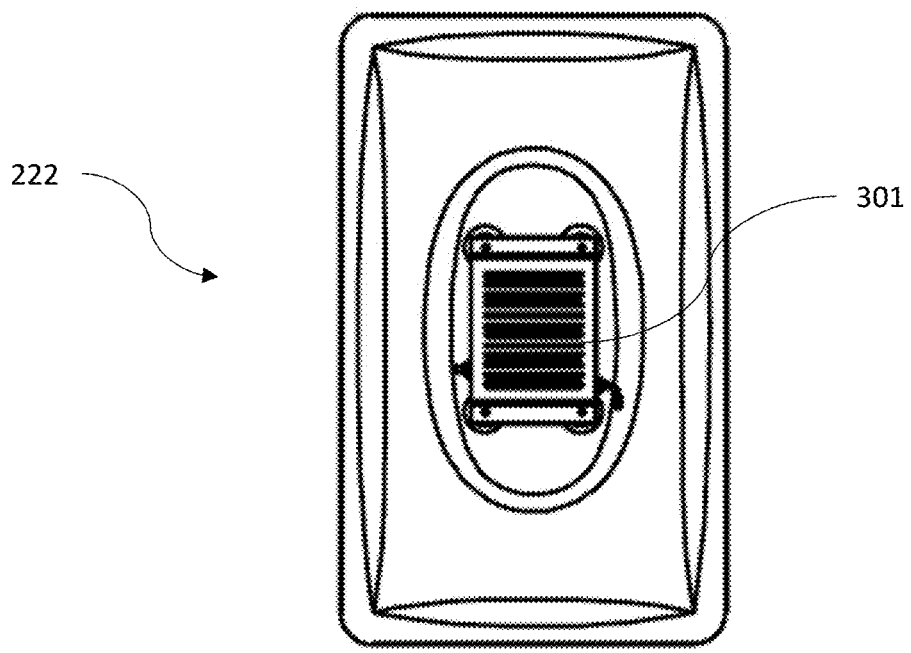
FIG. 24 illustrates a front view of a knee space incorporating a heater according to one embodiment of the present invention.

FIG. 24 illustrates a front view of a knee space 222 incorporating a heater 301 according to one embodiment of the present invention.

Figure 25:
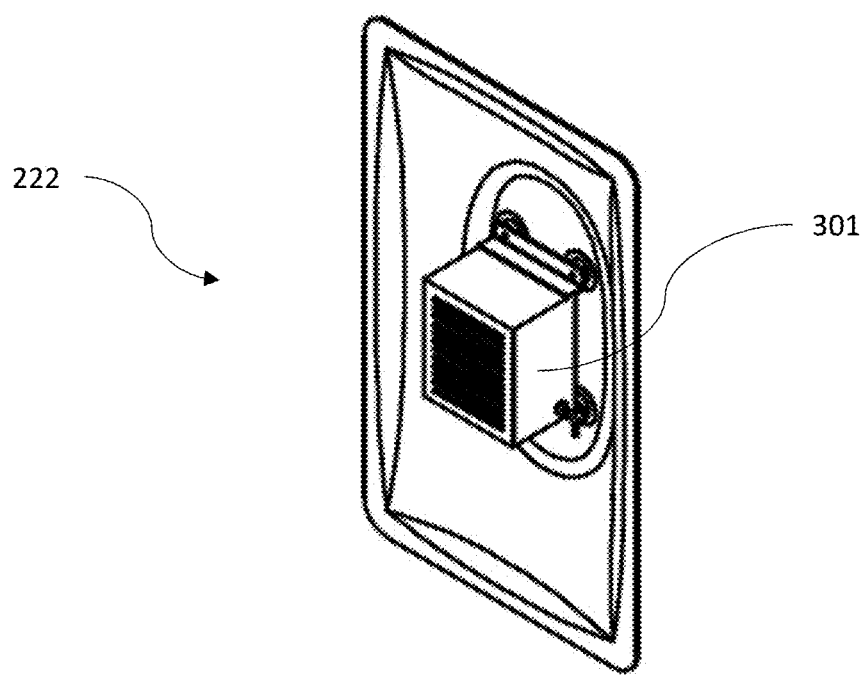
FIG. 25 illustrates a side perspective view of the knee space incorporating a heater illustrated in FIG. 24.

FIG. 25 illustrates a side perspective view of the knee space 222 incorporating a heater 301 illustrated in FIG. 24.

Figure 26:
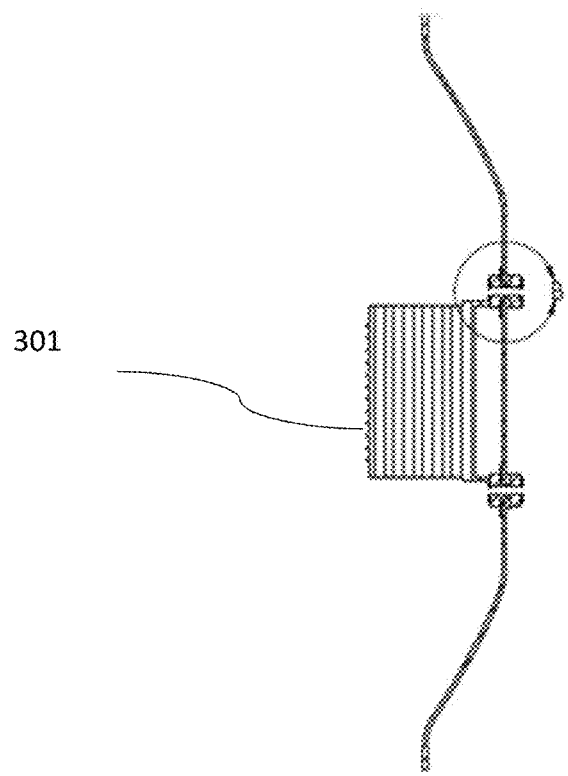
FIG. 26 illustrates a side cross-section view of the knee space incorporating a heater illustrated in FIG. 24 and FIG. 25.

FIG. 26 illustrates a side view of the knee space incorporating a heater 301 illustrated in FIG. 24 and FIG. 25.

Figure 27:
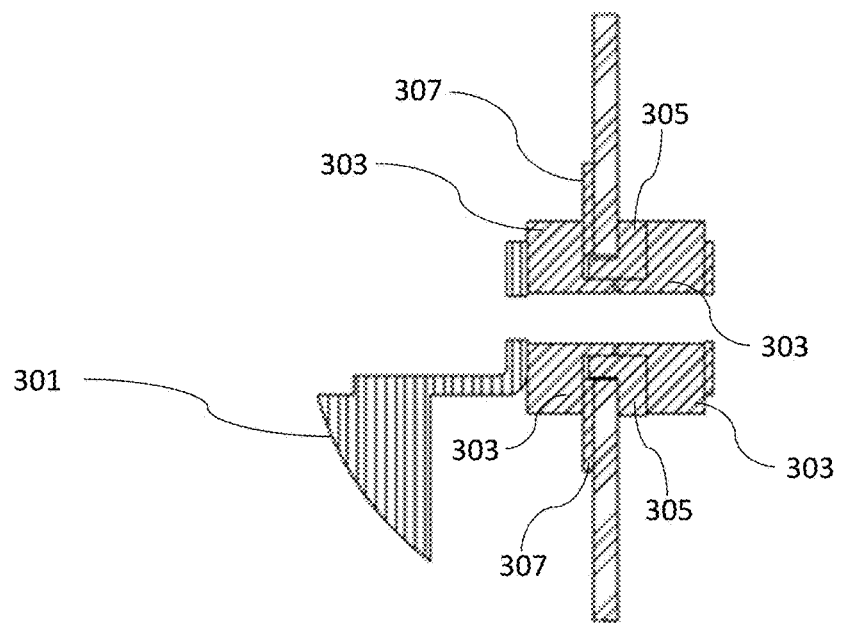
FIG. 27 illustrates a close-up side cross-section view of the heater and mounting bracket of the embodiment of FIG. 26.

FIG. 27 illustrates a close-up side view of the circled portion of the knee space incorporating a heater illustrated in FIG. 26, showing a heater 301 attached to the knee space via mounting bushings. A mounting bushing includes internal bushings 303, an external bushing 305, and a washer 307. The bushings are partially internal to and concentric with a mounting hole in the knee space. In one embodiment, the internal bushings 303 are molded rubber bushings, the external bushings 305 are molded plastic bushings and the washers 307 are molded plastic washers. The washer is sized to have its inner diameter match the diameter of the hole in the knee space, its outer diameter be large so as to spread out load, and its thickness thin enough to be flexible and spread out load, but thick enough to fill in space in the assembly. The washer is peripheral to the external bushing and positioned on the side of the mounting bushing closest to the heater or other device. Alternatively or additionally, the washer is placed on the side farthest from the heater. The individual bushings are stepped barrel bushings that fit together to form the mounting bushing. Preferably, the bushings and washers are constructed of molded polycarbonate to eliminate any microscopic defects that are associated with drilled holes in polycarbonate. The illustrated configuration of the heater, bushings, and washers (FIG. 27) functions to isolate vibrations and thereby prevents cracking of the knee space material, which is preferably clear polycarbonate, under stress conditions, such as road conditions. Road conditions can be simulated by a platform roading test, such as a shaker test, wherein the platform is shaken to simulate traveling on a road. Fasteners (not pictured), preferably bolts, secure the heater to the knee space via the bushings and washers. The bushings and washers spread out the load and dampen vibration during operation, thereby further reducing localized stress on the polycarbonate.

Figure 28:
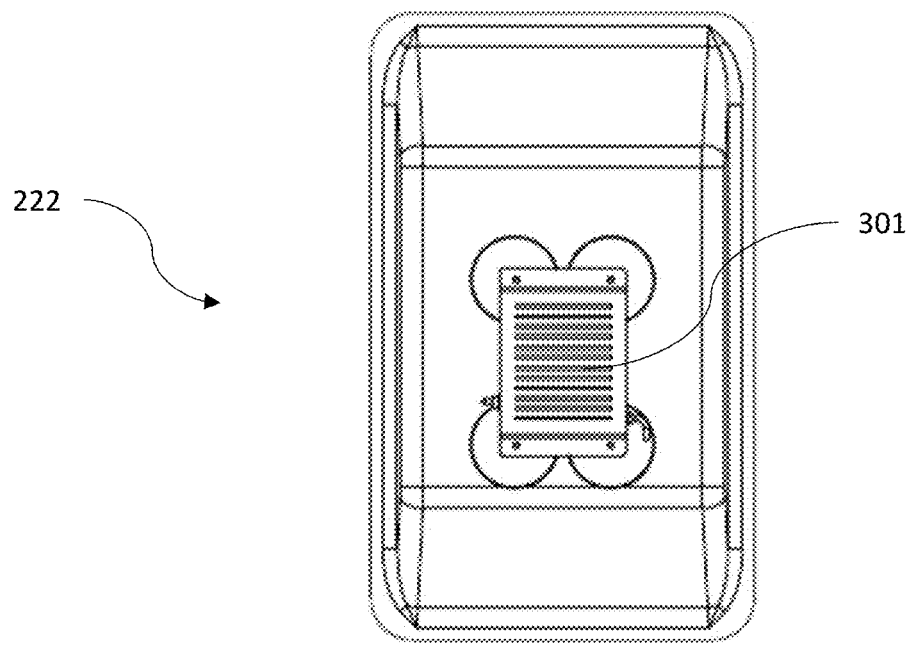
FIG. 28 illustrates a front view of a knee space incorporating a heater according to another embodiment of the present invention.

FIG. 28 illustrates a front view of a knee space incorporating a heater according to another embodiment of the present invention.

Figure 29:
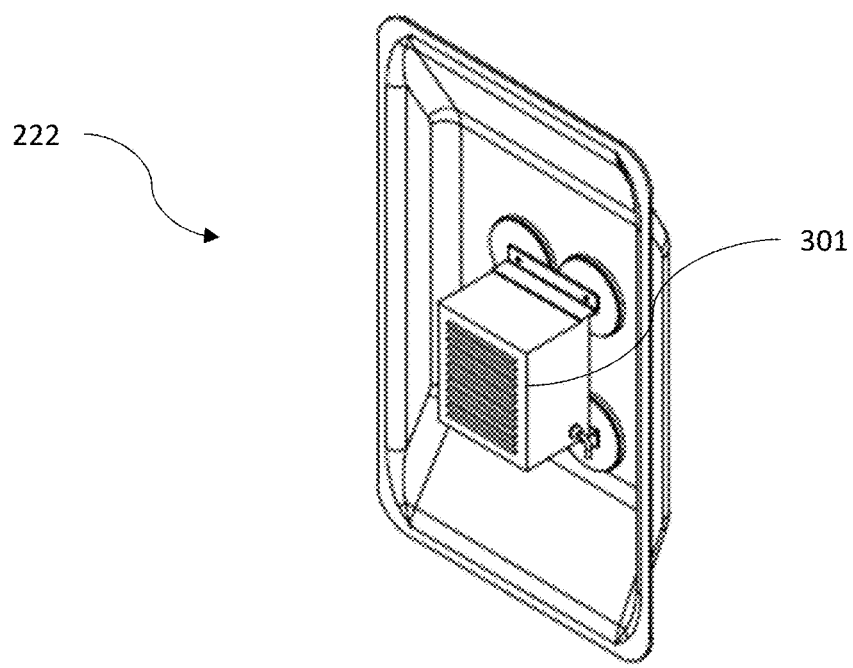
FIG. 29 illustrates a side perspective view of the knee space incorporating a heater illustrated in FIG. 28.

FIG. 29 illustrates a side perspective view of the knee space incorporating a heater illustrated in FIG. 28.

FIG. 30 illustrates a side cross-section view of the knee space incorporating a heater 301 illustrated in FIG. 28 and FIG. 29 with another mounting bushing embodiment. FIG. 31 is a closer view of the heater and mounting of FIG. 30.

FIG. 32 illustrates a close-up side cross-section view of the circled portion of the knee space incorporating a heater illustrated in FIGS. 30 and 31, showing a heater 301 attached to the knee space via a mounting bushing that includes a silicone tube 309, silicone washers 311, and composite washers 313. The silicone tube is concentric with and internal to a mounting hole in the plastic structure, the silicone washers are peripheral to and concentric with the silicone tube, and the composite washers are external to and cover the silicone tube. The washers are sized to spread out load away from the drill hole in the knee space (diameter of the washer) while minimizing weight (thickness of the washer). The washers should be thick enough so they can sufficiently spread out load away from the drilled hole, while being as thin as possible to reduce weight.

The illustrated configuration of the heater, tubes, and washers isolates vibrations and thus prevents cracking of the knee space material, which is preferably clear polycarbonate, under stress induced by road conditions. Fasteners (not pictured), preferably bolts, secure the heater to the knee space via the rubber tubes and washers. The washers spread out the load and dampen vibration during operation, thereby further reducing localized stress on the polycarbonate. While the present embodiment is directed to mounting a heater, the mounting bushing can be used to mount any device where isolation of vibration is needed.

Thus, a component for a utility vehicle according to the present invention, includes a multi-sheet component; wherein the multi-sheet component includes at least one gap between at least two sheets of the multi-sheet component; thereby providing a component with increased stiffness and reduced depth. In one embodiment, at least one sheet of the multi-sheet component is thermoformed and there is a core material in at least one gap between the at least two sheets.

In another embodiment, the multiple sheets are joined by chemical bonding, physical bonding, welding, magnetism, vacuum and/or mechanical fastening.

Preferably, the at least one sheet is made from dielectric, impact-resistant and/or corrosion-resistant materials, including reinforced thermosets, unreinforced thermosets, reinforced thermoplastics, and/or unreinforced thermoplastics.

In one embodiment, at least one sheet is corrugated with a frustum corrugation, a ribbed corrugation and/or domed corrugation. A preferred corrugation is a conical frustum corrugation.

In another embodiment, the component has a front sheet and a back sheet; the back sheet is corrugated; and the height of the corrugation on the back sheet is approximately half of the overall component cross-section. The corrugation on the front sheet extends into the component to meet the corrugation on the back sheet; thereby creating a mounting location on the front sheet to mount conductive hardware through. The mounting location is fully recessed into the front sheet with raised surfaces surrounding it; thereby shielding the conductive hardware from contacting a conductor greater than the width of the corrugation on the front sheet.

A method according to the present invention for manufacturing a multi-sheet component with at least a first sheet and a second sheet for a utility vehicle includes forming the first sheet and manufacturing the second sheet onto the first sheet.

In some embodiments, the method further includes the step of inserting a core material between the sheets when manufacturing the second sheet to the first sheet and joining the sheets by chemical bonding, physical bonding, welding, vacuum, magnetism, or mechanical fastening. The at least one sheet is made from dielectric materials, including reinforced thermosets, unreinforced thermosets, reinforced thermoplastics, and/or unreinforced thermoplastics. In a preferred embodiment, a conical frustum corrugation is formed in at least one sheet, preferably in the first sheet when forming the first sheet.

A component for a utility vehicle according to the present invention, includes an outer surface and an inner surface; and wherein the outer surface and the inner surface are separated by corrugation. The outer surface, inner surface, and corrugation are integrally formed or separately formed in one embodiment. The component includes a conical frustum corrugation.

A method for manufacturing a component for a utility vehicle according to the present invention, includes forming the component using digital light synthesis, injection molding, infusion, compression molding, and/or 3D printing. The digital light synthesis preferably includes continuous liquid infusion production. The method preferably creates a conical frustum corrugation in the component; wherein the frusta have base diameters of between about 2 and about 4 inches.

The above-mentioned examples are provided to serve the purpose of clarifying the aspects of the invention, and it will be apparent to one skilled in the art that they do not serve to limit the scope of the invention. By way of example, the splicer platform can include a step for easier access. Also by way of example, the splicer door can accommodate the mounting of a shield to protect the user from debris or from inclement weather. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A method for manufacturing a multi-sheet component including a first sheet that contains a first surface and one or more first corrugations with a first height and a first recessed surface recessed a first depth from the first surface, and a second sheet that contains a second surface and one or more second corrugations with a second height and a second recessed surface recessed a second depth from the second surface, wherein the one or more first corrugations and the one or more second corrugations extend toward each other between the first sheet and the second sheet of the multi-sheet component to form a recessed mounting location that is recessed from the first surface and recessed from the second surface, a conductive hardware mounted through the first recessed surface and the second recessed surface at the recessed mounting location, and wherein the first height prevents the conductive hardware from contacting a conductive object having a dimension greater than the first height, the method comprising:
   thermoforming the first sheet;
   inserting a core material between the first sheet and the second sheet; and
   manufacturing the second sheet onto the first sheet and the core material.

2. The method of claim 1, wherein the multi-sheet component is a hinged door.

3. The method of claim 1, wherein the one or more first corrugations of the first sheet includes a frustum corrugation.

4. The method of claim 1, further comprising removing the core material after manufacturing the second sheet onto the first sheet and the core material.

5. The method of claim 1, wherein the core material completely or partially fills a gap between the first sheet and the second sheet.

6. The method of claim 1, wherein the first sheet and the second sheet are separated by at least one gap.

7. A multi-sheet component comprising:
   a first sheet composed of a thermoformable plastic, the first sheet comprising:
   a first surface; and
   one or more first corrugations with a first height and a first recessed surface recessed a first depth from the first surface;
   a second sheet composed of a thermoformable plastic, the second sheet comprising:
   a second surface; and
   one or more second corrugations with a second height and a second recessed surface recessed a second depth from the second surface,
   wherein the one or more first corrugations and the one or more second corrugations extend toward each other between the first sheet and the second sheet of the multi-sheet component to form a recessed mounting location that is recessed from the first surface and recessed from the second surface; and
   a conductive hardware mounted through the first recessed surface and the second recessed surface at the recessed mounting location,
   wherein the first height prevents the conductive hardware from contacting a conductive object having a dimension greater than the first height.

8. The multi-sheet component of claim 7, wherein the multi-sheet component is a hinged door.

9. The multi-sheet component of claim 7, wherein the one or more first corrugations includes a frustum corrugation.

10. The multi-sheet component of claim 7, wherein a core material completely or partially fills a gap between the first sheet and the second sheet.

11. A multi-sheet component comprising:
   a first sheet composed of a thermoformable plastic, the first sheet comprising:
   a first surface; and
   one or more first corrugations with a first height and a first recessed surface recessed a first depth from the first surface;
   and a second sheet composed of fiberglass, the second sheet comprising:
   a second surface; and
   one or more second corrugations with a second height and a second recessed surface recessed a second depth from the second surface,
   wherein the one or more first corrugations and the one or more second corrugations extend toward each other between the first sheet and the second sheet of the multi-sheet component to form a recessed mounting location that is recessed from the first surface and recessed from the second surface; and a conductive hardware mounted through the first recessed surface and the second recessed surface at the recessed mounting location, wherein the first height prevents the conductive hardware from contacting a conductive object having a dimension greater than the first height width.

12. The multi-sheet component of claim 11, wherein the multi-sheet component is a hinged door.

13. The multi-sheet component of claim 11, wherein the multi-sheet component further includes a core material between the second sheet and the first sheet.

14. The multi-sheet component of claim 13, wherein the core material completely or partially fills a gap between the first sheet and the second sheet.

15. The multi-sheet component of claim 10, wherein the core material is configured to be at least partially removed after manufacturing of the first sheet and the second sheet.

16. The method of claim 1, wherein the core material is configured to be at least partially removed after manufacturing of the first sheet and the second sheet.

17. The multi-sheet component of claim 10, wherein the core material is configured to be at least partially removed after manufacturing of the first sheet and the second sheet.

18. The method of claim 1, wherein the first height is different than the second height.

19. The multi-sheet component of claim 7, wherein the first height is different than the second height.

20. The multi-sheet component of claim 11, wherein the first height is different than the second height.

* * * * *